(12) United States Patent
Lyuboshenko

(10) Patent No.: US 12,443,023 B2
(45) Date of Patent: Oct. 14, 2025

(54) LIGHT SHEET MICROSCOPE HAVING STREAMLINED FIELD OF VIEW CHANGES

(71) Applicant: Igor Lyuboshenko, Le Plessis-Robinson (FR)

(72) Inventor: Igor Lyuboshenko, Le Plessis-Robinson (FR)

(*) Notice: Subject to any disclaimer, the term of this patent is extended or adjusted under 35 U.S.C. 154(b) by 582 days.

(21) Appl. No.: 17/740,012

(22) Filed: May 9, 2022

(65) Prior Publication Data

US 2022/0365328 A1  Nov. 17, 2022

Related U.S. Application Data

(60) Provisional application No. 63/282,019, filed on Nov. 22, 2021, provisional application No. 63/188,921, filed on May 14, 2021.

(51) Int. Cl.
  *G02B 21/00* (2006.01)
  *G02B 21/24* (2006.01)

(52) U.S. Cl.
  CPC ....... *G02B 21/006* (2013.01); *G02B 21/0048* (2013.01); *G02B 21/0076* (2013.01); *G02B 21/248* (2013.01)

(58) Field of Classification Search
  CPC ............. G02B 21/006; G02B 21/0048; G02B 21/0076; G02B 21/248; G02B 21/365; G02B 21/367; G02B 21/0032
  See application file for complete search history.

(56) References Cited

U.S. PATENT DOCUMENTS

| | | | |
|---|---|---|---|
| 6,259,960 B1 * | 7/2001 | Inokuchi | G01N 21/9501 700/109 |
| 7,554,725 B2 | 6/2009 | Stelzer | |
| 7,787,179 B2 | 8/2010 | Lippert | |
| 8,482,854 B2 | 7/2013 | Lippert | |

(Continued)

FOREIGN PATENT DOCUMENTS

| | | |
|---|---|---|
| EP | 2149064 | 8/2013 |
| EP | 3264153 | 5/2019 |

(Continued)

OTHER PUBLICATIONS

Sarah Lukes, "Dynamic and Agile Focusing in Microscopy: A Review" in: "Dynamic and Agile Focusing in Microscopy: A Review", Jan. 1, 2016.

(Continued)

*Primary Examiner* — Mustak Choudhury
(74) *Attorney, Agent, or Firm* — Van Pelt, Yi & James LLP

(57) ABSTRACT

A method for viewing a microscopy specimen is described. The method includes receiving a request to change a field of view of an optical microscope system that images the microscopy specimen. In response to the request, a current field of view is automatically changed to a new field of view. Parameters of the optical microscope system are automatically adjusted to align an illumination plane of a light sheet of the optical microscope system and a detection plane of the optical microscope system. The adjustment of parameters to align the illumination plane with the detection plane is based at least on precalibrated parameters that correspond to the new field of view, the illumination path objective, and the detection path objective.

25 Claims, 16 Drawing Sheets

(56) References Cited

U.S. PATENT DOCUMENTS

| | | | |
|---|---|---|---|
| 8,699,133 | B2 | 4/2014 | Lippert |
| RE45,575 | E | 6/2015 | Lippert |
| 9,316,824 | B2 | 4/2016 | Shroff |
| 9,404,869 | B2 | 8/2016 | Keller |
| 9,411,142 | B2 | 8/2016 | Ue et al. |
| 9,423,601 | B2 | 8/2016 | Toda |
| 9,587,213 | B2 | 3/2017 | Morgan |
| 10,007,100 | B2 | 6/2018 | Kikuchi |
| 10,379,329 | B2 * | 8/2019 | Ue ............ G02B 21/367 |
| 10,739,266 | B2 | 8/2020 | Keller |
| 10,746,981 | B2 | 8/2020 | Tomer |
| 11,156,822 | B2 * | 10/2021 | Lyuboshenko ...... H04N 23/675 |
| 11,933,972 | B2 | 3/2024 | Lotter |
| 2007/0176103 | A1 * | 8/2007 | Inada ............ G06V 20/69 250/311 |
| 2012/0282667 | A1 | 11/2012 | Lippert |
| 2014/0202265 | A1 | 7/2014 | Hellmich |
| 2015/0098126 | A1 * | 4/2015 | Keller ............ G02B 21/367 359/385 |
| 2016/0124201 | A1 | 5/2016 | Kikuchi |
| 2016/0214107 | A1 | 7/2016 | Viasnoff |
| 2016/0241758 | A1 | 8/2016 | Dohi |
| 2016/0306154 | A1 | 10/2016 | Iguchi |
| 2017/0038575 | A1 | 2/2017 | Pretorius |
| 2017/0261731 | A1 | 9/2017 | Shimada |
| 2018/0031816 | A1 | 2/2018 | Shimada |
| 2018/0164569 | A1 | 6/2018 | Brinkman |
| 2018/0180867 | A1 | 6/2018 | Shimada |
| 2018/0275389 | A1 | 9/2018 | Shepherd |
| 2018/0314047 | A1 | 11/2018 | Shimada |
| 2019/0302439 | A1 * | 10/2019 | Lyuboshenko ........ G02B 21/10 |

FOREIGN PATENT DOCUMENTS

| | | |
|---|---|---|
| WO | 2014056992 | 4/2014 |
| WO | 2016166151 | 10/2016 |
| WO | 20160178856 | 11/2016 |
| WO | 2017062741 | 4/2017 |
| WO | 2018033581 | 2/2018 |

OTHER PUBLICATIONS

Adams et al. Light Sheet Fluorescence Microscopy (LSFM) in: "Current Protocols in Cytometry", pp. 12.37.1-12.37.15. Jan. 2015.

Chhetri et al: "Whole-animal functional and developmental imaging with isotropic spatial resolution", Nature Methods. vol. 12. No. 12. Dec. 1, 2015 (Dec. 1, 2015). pp. 1171-1178. XP055611986. New York, ISSN: 1548-7091. DOI: 10.1038/nmeth.3632.

Chmielewski et al., "Fast imaging of live organisms with sculpted light sheets", Scientific Reports, Apr. 20, 2015.

De Medeiros et al: "Confocal multiview light-sheet microscopy", Nature Communications, vol. 6. No. 1. Nov. 25, 2015 (Nov. 25, 2015). XP055587306. DOI: 10.1038/ncomms9881, p. 4.

Dean et al., Deconvolution-Free Subcellular Imaging with Axially Swept Light Sheet Microscopy, Biophysical Journal, vol. 108, Jun. 2015, pp. 2807-2815.

Dean et al., Diagonally Scanned Light-Sheet Microscopy for Fast Volumetric Imaging of Adherent Cells, Biophysical Journal 110, Biophysical Society, Mar. 29, 2016, pp. 1456-1465.

Dean et al., Uniform and Scalable Light-Sheets Generated by Extended Focusing, Department of Cell Biology, University of Texas Southwestern Medicate Center, Optics Express, vol. 22, No. 21, Oct. 16, 2014.

Fahrbach et al., "Rapid 3D light-sheet microscopy with a tunable lens", Optics Express, vol. 21, No. 18, p. 21010-21026, Aug. 30, 2013.

Hedde et al., "sideSPIM—selective plane illumination based on a conventional inverted microscope", from Biomedical Optics Express, vol. 8, No. 9, p. 3918-3937, Aug. 1, 2017.

Hedde et al., Selective Plane Illumination Microscopy with a Light Sheet of Uniform Thickness Formed by an Electrically Tunable Lens, Microscopy Research and Technique, Jun. 24, 2016.

Huisken et al: "Even fluorescence excitation by multidirectional selective plane illumination microscopy (mSPIM)" Optics letters, Optical Society of America, vol. 32, No. 17, Sep. 1, 2007.

Jan Huisken et al., "Selective Plane Illumination Microscopy", In: "Handbook of Biological Confocal Microscopy", Jan. 1, 2006, Springer, New York, NY. pp. 672-675.

Koho et al., Image Quality Ranking Method for Microscopy, Scientific Reports, Jul. 1, 2016.

Power et al: "A guide to light-sheet fluorescence microscopy for multiscale imaging", Nature Methods, vol. 14, No. 4, Apr. 1, 2017 (Apr. 1, 2017), pp. 360-373, XP055536560, New York, ISSN: 1548-7091, DOI: 18.1038/nmeth.4224, p. 367.

Yang et al: "Dual-slit confocal light sheet microscopy for in vivo whole-brain imaging of zebrafish", Biomedical Optics Express, vol. 6, No. 5, May 1, 2015 (May 1, 2015), p. 1797, XP055514896, United States, SSN: 2156-7085, DOI: 10.1364/BOE.6.001797.

Yi et al., "Light-sheet fluorescence imaging to localize cardiac lineage and protein distribution", Scientific Reports, vol. 7, No. 1, Mar. 1, 2017.

Zeiss, Zeiss Lightsheet 7, Light Sheet Fluorescence Microscopy for Multiview Imaging of Living and Cleared Specimans, Feb. 2020, pp. 1-4.

Zong et al., Large-field high-resolution two-photon digital scanned light-sheet microscopy, Cell Research, vol. 25, No. 2, Sep. 26, 2014, pp. 254-257.

* cited by examiner

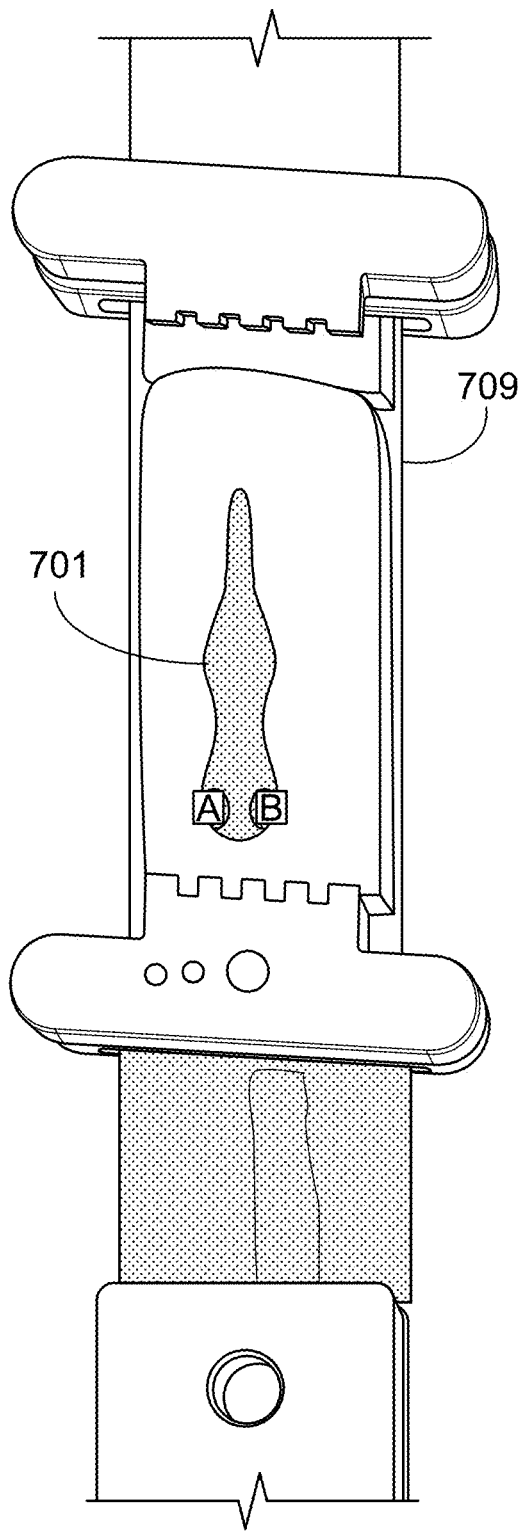
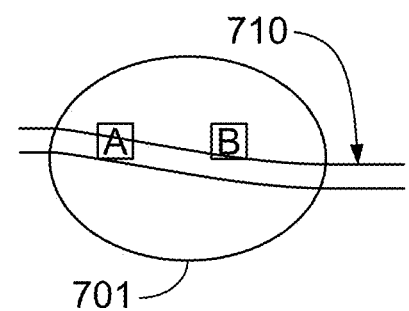
FIG. 7A
FIG. 7B

LIGHT SHEET MICROSCOPE HAVING STREAMLINED FIELD OF VIEW CHANGES

CROSS REFERENCE TO OTHER APPLICATIONS

This application claims priority to U.S. Provisional Patent Application No. 63/188,921 entitled LIGHT SHEET FLUORESCENCE MICROSCOPE INCLUDING A CALIBRATION WEDGE filed May 14, 2021 and U.S. Provisional Patent Application No. 63/282,019 entitled LIGHT SHEET MICROSCOPE filed Nov. 22, 2021, both of which are incorporated herein by reference for all purposes.

BACKGROUND OF THE INVENTION

Light sheet fluorescence microscopy or selective plane illumination microscopy (SPIM) technology typically relies on illuminating of a specimen in thin optical slices, formed from laser light (i.e. light sheets), exciting the fluorophores in the specimen, and acquiring light emitted by the illuminated plane inside the specimen. The direction in which the light is detected is typically perpendicular to the illuminated plane. SPIM allows for the acquisition of a single illuminated slice in one camera frame. Images from light sheet microscopes exhibit a better signal-to-noise (S/N) ratio and a higher dynamic range than images produced by confocal fluorescence microscopes. Moreover, a sequence of multiple images may be rapidly captured for a given microscopy specimen. In SPIM, the excitation is restricted to the fluorophores in the volume near the focal plane (i.e. near the light sheet). Compared to confocal fluorescence microscopy, light sheet microscopy provides optical sectioning with much smaller illuminated volume thus lower photo bleaching and photo toxicity. Two-dimensional (2D) imaging can also be performed with quality optical sectioning at very high speed compared to confocal imaging. Therefore, volume acquisition and long term imaging can be achieved in much better conditions than any other microscopy techniques.

Current SPIM systems produce images either of low resolution for large samples (e.g., mouse brain, kidney, liver, muscles, etc.) or of high resolution for small samples (e.g., zebra fish, spheroids). There is no way to observe the same large-sized clarified or translucent specimen both as a whole/at lower magnification (macro view) and as a collection of much smaller specific inner parts at a higher resolution/at higher magnification (micro view). Furthermore, switching from macro to micro view typically requires the user to manually refocus the image, which can be time consuming. As a result, the benefits of SPIM related to rapidly capturing a large number of images of the microscopy specimen may be lost. Accordingly, what is needed is an improved mechanism for acquiring images of a variety of views.

BRIEF DESCRIPTION OF THE DRAWINGS

Various embodiments of the invention are disclosed in the following detailed description and the accompanying drawings.

FIGS. 7A-7B depict an embodiment of changes in the field of view.

DETAILED DESCRIPTION

Figure 1A:
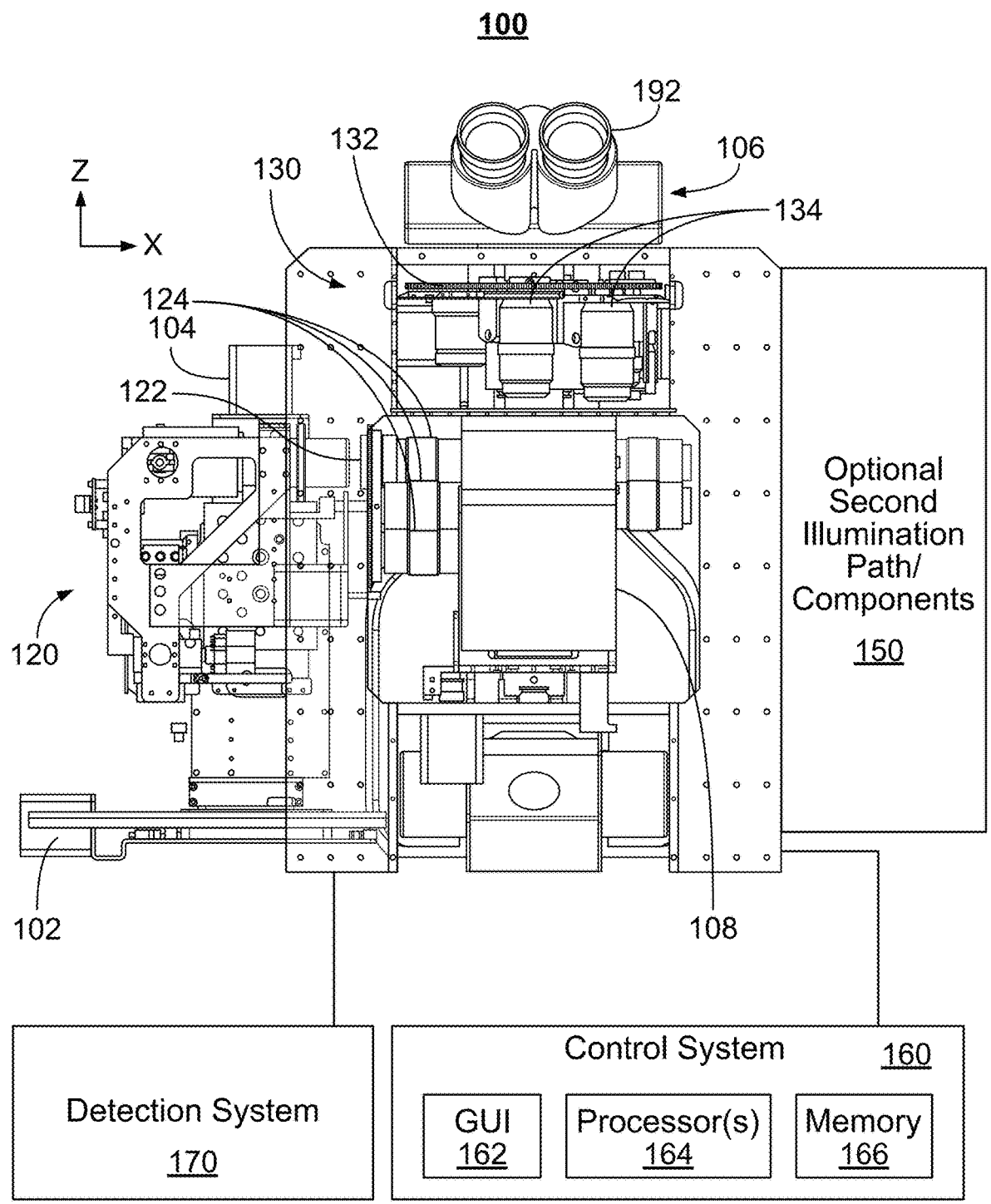
FIGS. 1A-1E are diagrams illustrating an embodiment of components of a system for imaging a microscopy specimen using SPIM.
Figure 1B:
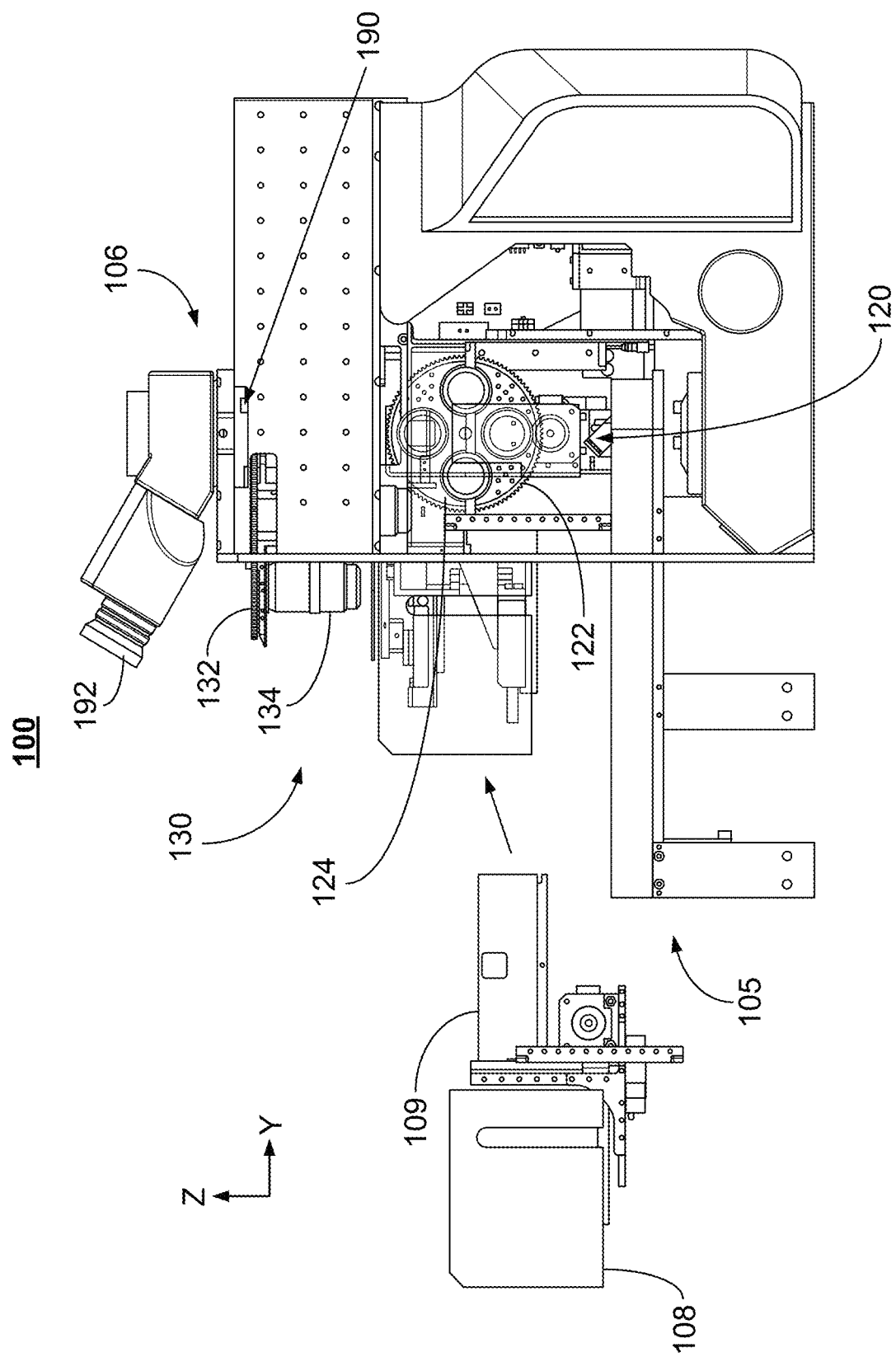
Figure 1C:
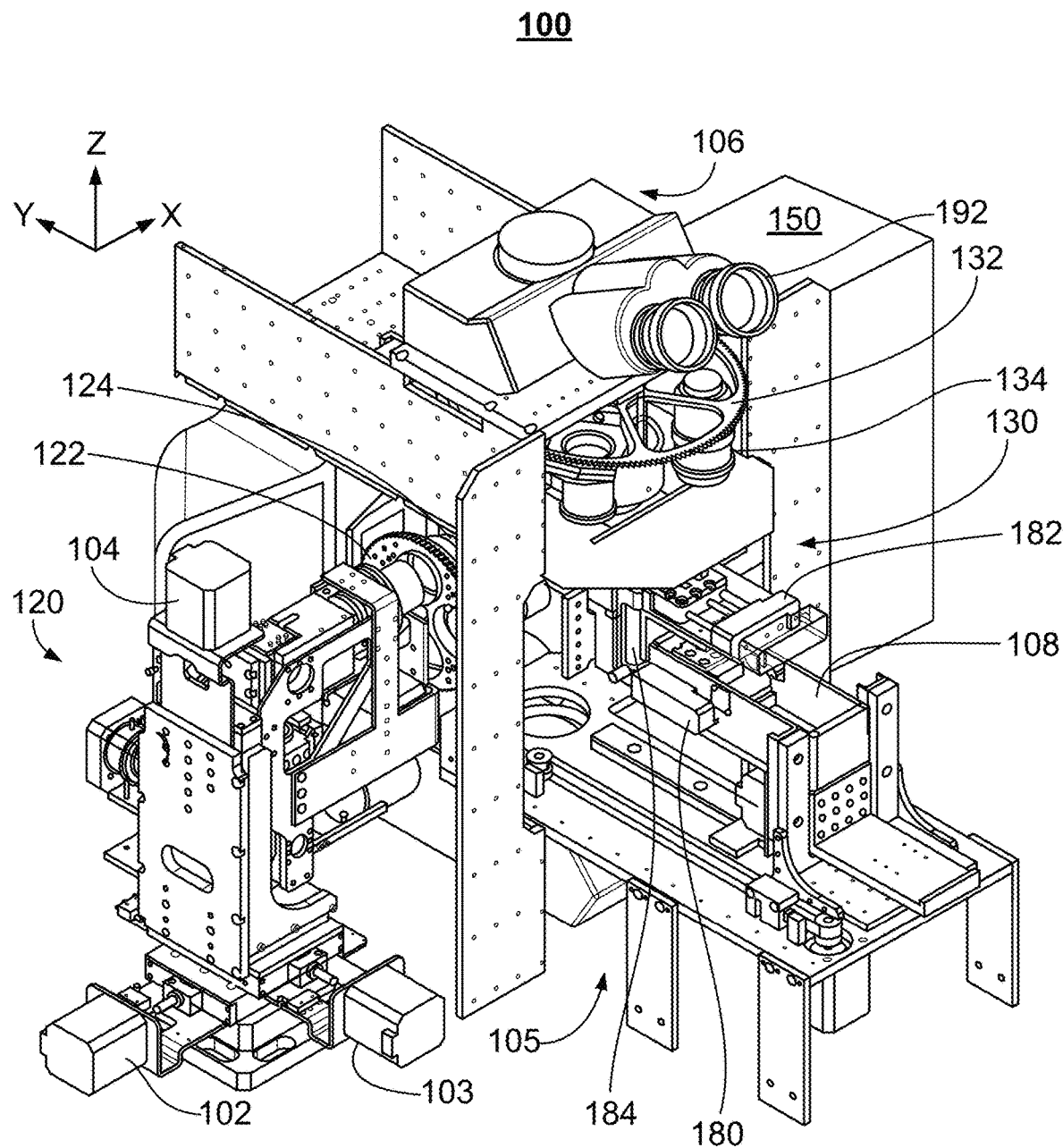
Figure 1D:
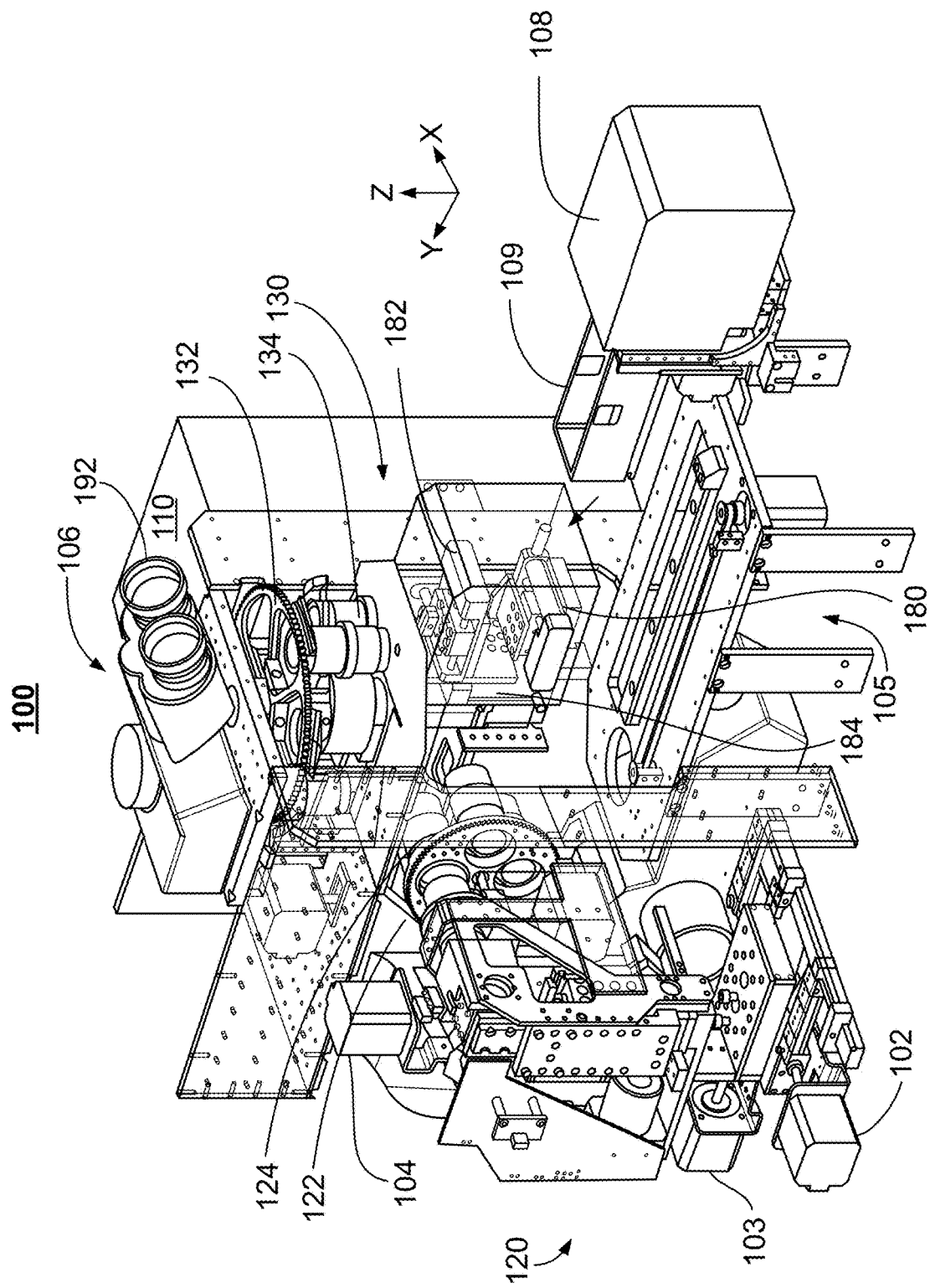

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A three-dimensional selective plane light-sheet microscopy (SPIM), or light-sheet fluorescence microscopy (LSFM), facilitates rapid, high signal to noise ratio (SNR) image capture for microscopy specimens, while allowing for reduced photo bleaching and photo toxicity. To do so, the LSFM focuses laser light into a thin light sheet and illuminates optical slices of the microscopy specimen with the light sheet. In LSFM, the light sheet is produced both by providing a stationary beam having an extremely elongated (elliptical) cross section and by creating a virtual light sheet by rapidly scanning the object with a light beam having a circular cross section. The illumination excites fluorophores in the specimen. The light emitted by specimen is detected, typically perpendicular to the illuminated plane. Typically, a camera captures an illuminated slice in a camera frame. Thus, a sequence of multiple images may be rapidly captured for a given microscopy specimen. Because the excitation of fluorospheres is restricted to the volume near the light sheet, photo bleaching and photo toxicity may be reduced. Two-dimensional (2D) imaging can also be performed with quality optical sectioning at very high speed compared to confocal imaging. Therefore, volume acquisition and long term imaging can be achieved in much better conditions than any other microscopy techniques.

In conventional light sheet microscopy, as in other fluorescence microscopy techniques, it is customary to image a specimen as a whole with coarse resolution provided by low magnification objectives. For example, a macro view of the specimen may be provided using low magnification objectives in the illumination path and in the detection path. The macro view may be used to obtain information on orientation and geometric proportions of the specimen as a whole. Higher magnification illumination and/or detection path objective are then used to observe tinier structures within that specimen with its micro view, provided only by higher magnification objectives allowing to zoom in on the required structures.

Although SPIM allows for switching between macro and micro views, there are several drawbacks. The selection of illumination path objectives and detection path objectives as well as the subsequent focusing remains manual and cumbersome. For example, a typical scenario includes illuminating the specimen with a low magnification (e.g., 2×) illumination path objective (i.e. an objective in the illumination path) and detecting the fluorescent emission with the corresponding low magnification (e.g., 2×) detection path objective (i.e. an objective in the detection path) and finding a region of particular interest within the specimen. One or both of the low magnification objectives are manually switched with higher magnification objectives. By trial and error, the previously located region of interest is found again. This region is then imaged with the higher magnification objective(s). This process, however, is time consuming and prone to lack of guidance regarding the location of the region of interest. For example, the region of interest may be lost due to misalignment of the light sheets produced by low- and higher-magnification illumination path objectives and/or due to misalignment between focal planes of low and higher magnification detection path objectives. Issues due to the misalignment between detection path objectives is compounded when the specimen resides in an aqueous solution. In such cases, the detection path objectives may be required to be gently placed into or out of contact with the medium in which the specimen is placed or embedded. In some cases, the sample chamber is sealed from the illumination and detection sides to preclude the leakage of the aqueous solution from the sample chamber while placing the detection path objective firmly in contact with the aqueous solution. This configuration renders the change from macro to micro view and vice versa impractical because the detection path objective is attached to the sample chamber and makes a constituent part thereof.

The lack of parfocality (i.e. the ability of several objectives to focus at the same plane) complicates switching between macro and micro views. Changing of the illumination and detection path objectives may alter the location of the light sheet and the focal length of the detection path objective. The parfocality can also be very difficult to achieve without knowledge of characteristics of the immersion medium (e.g., the refractive index of the immersion medium). As multi-color images are routinely acquired in light sheet microscopy, dispersion (i.e., dependence of the refractive index of the medium on the wavelength of light) compounds the lack of parfocality even in cases where the characteristics of the immersion medium are known. Even if the characteristics of the medium are known, settling refractive index to a set value may take some time as a new sample is introduced to the immersion medium. This may make obtaining high-resolution images far more complex and time-consuming.

Getting the highest possible lateral (XY) resolution as well as axial (Z) resolutions are interdependent processes, so the design of the LSFM uses careful alignment of the detection plane of the detection path objective with the illumination axis of the illumination path objectives and makes the axes of illumination path objectives coincide with the detection plane of the detection path objectives. This process is rendered complex and time consuming by only partial knowledge of exact value of refractive index of the immersion medium in which a specimen resides and which the specimen influences.

Thus, switching between macro and micro views is typically performed manually, is time consuming and may be error prone. This significantly complicates switching between macro and macro views without compromising one of the main advantages the LSFM is acclaimed for: the speed of acquiring high quality images. Consequently, techniques for improving the use of LSFM for both macro views and micro views are desired.

A method and system for viewing a microscopy specimen are described. The method includes receiving a request to change a field of view of an optical microscope system that images a microscopy specimen. In response to the request, a current field of view is automatically changed to a new field of view. In some cases, changing the field of view includes placing an illumination path objective in an illumination path and/or placing a detection path objective in a detection path. Thus, magnification for the specimen may change. Further, parameters of the optical microscope system are automatically adjusted to align an illumination plane of a light sheet of the optical microscope system and a detection plane of the optical microscope system. The adjustment of parameters to align the illumination plane with the detection plane is based at least on precalibrated parameters that correspond to the new field of view, the illumination path objective, and the detection path objective. In some embodiments, the method includes automatically fine focusing the new field of view after the automatically adjusting the parameters is completed. In addition, the chromaticity of the illumination path objective and/or the chromaticity of the detection path objective and/or a chromatic dispersion of the microscopy specimen may be accounted for.

An optical microscope system is described. The system includes illumination optical elements, illumination mechanical elements, detection optical elements, and a computer system. The illumination optical elements are in an illumination path and configured to at least in part transform light from an illumination source into a light sheet illuminating the microscopy specimen. The illumination optical elements include an illumination path objective. The illumination mechanical elements are for the illumination path and configured to at least in part modify at least one of the location of the light sheet illuminating the microscopy specimen or a microscopy specimen location. For example, the illumination mechanical elements may include stage motors and/or motorized controls used to automatically move the stage in which the microscopy sample is mounted. The detection optical elements are in a detection path and include a detection path objective. The computer system is coupled to the illumination optical elements, to the illumination mechanical elements, and to the detection optical elements. The computer system includes a processor and a memory. The memory is coupled with the processor and configured to provide the processor with instructions. The processor is configured to receive a request to change a field of view of an optical microscope system imaging the microscopy specimen. In response to the request, the processor is configured to cause at least one of the plurality of illumination elements or the plurality of detection optical elements to automatically change from a current field of view to a new field of view. The processor is also configured to automatically adjust parameters of the optical microscope system to align an illumination plane of a light sheet of the optical microscope system and a detection plane of the optical microscope system for the requested change based at least on a plurality of precalibrated parameters that correspond to the new field of view, an illumination path objective for the illumination path, and a detection path objective for the detection path.

FIGS. 1A-1E are diagrams illustrating an embodiment of components of system 100 for imaging a microscopy specimen using SPIM, or LSFM. System 100 may be considered an optical microscope system 100, an LSFM, or a SPIM. Optical microscope system 100 includes stage motors 102, 103, and 104 used to modify the location of the light sheet illuminating the microscopy specimen along x-, y- and z-directions, respectively; stage motors 180, 182, and 184 used to modify the location of the microscopy specimen along x-, y- and z-directions, respectively; sample rotation motor 1086 (explicitly depicted and labeled in FIG. 10E and discussed with respect to FIGS. 10C-10E), used to rotate the sample holder around the y-direction axis of rotation; stage 105 (e.g. a translation stage) used for moving specimen holder assembly 108 in or out of the area illuminated with light sheet provided with the illumination unit(s) 120 and/or 150; optical microscope 106, specimen holder assembly 108 including specimen chamber 109, illumination unit 120, detection unit 130, and optional additional illumination unit 150. Detection unit 130 may include oculars 192 for direct observation of the specimen by a human. Detection unit 130 may include one or plurality of fluorescent optical filters 190 (e.g. bandpass, notch, etc. having positions indicated in FIG. 1B only) that may be installed along the detection light path downstream from the detection path objectives 134 and before oculars 192. The fluorescent optical filters 190 may be used to filter out laser light emitted by lasers and to pass light emitted by the specimen. As the laser light can be filtered out, thereby allowing safe direct observation of the microscopy specimen by a human. For example, the specimen may be observed directly by a human through oculars 192. Detection unit 130 may include other fluorescent optical filters that can be used downstream from the detection path objectives (i.e. whether or not the oculars 192 are used). The filters may be used to capture light by the specimen at one or a plurality of wavelengths. Also shown in FIG. 1A are control system 160, detection system 170, and sample rotation motor 1086. For simplicity, control system 160 and detection system 170 are not shown in FIGS. 1B-1E. The positions of control system 160 and detection system 170 are for explanatory purposes only and are not intended to show the location of a detection system and a control system in an optical microscope system. Detection system 170 is used to capture images of the microscopy specimen (not shown). In the embodiment shown, the illumination path of the light sheet through the microscopy specimen is in the x-direction and the detection path of the light is in the z-direction. Thus, the imager of detection system 170 is generally located in the z-direction from specimen chamber 109 during use and may include a digital camera. Control system 160 is a computer system including graphical (or other) user interface (GUI) 162, one or more processors 164, and memory 166. Other components of detection system 170, control system 160 and optical microscope system 100 are generally present but are not shown and/or not discussed for simplicity.

Illumination units 120 and 150 are designed to include or work with a laser source (e.g., fiber laser source) to produce a light sheet using a cylindrical lens. For simplicity, the components of additional illumination unit 150 are not shown. However, illumination unit 150 is analogous to illumination unit 120. Illumination unit 120 includes objectives 124 (of which three are indicated only in FIG. 1A) and rotating turret 122. Rotating turret 122 allows for the desired one of the objectives 124 to be placed in the illumination path. Illumination units 120 and 150 allow direct imaging of an optical section with a single frame at full camera resolution. For better illumination plane homogeneity across the specimen, two illumination units 120 and 150 are used on both sides of a specimen to compensate the absorption effects with a thick specimen. In some embodiments, the light sheet is projected using objective 124, which can be selected according to specimen size and detection magnification. Illumination units 120 and 150 may be designed to compensate chromatic shift for the visible spectrum, thus allowing the simultaneous illumination at several wavelengths using a laser combiner for multi-fluorescence imaging. Although two illumination units 120 and 150 are shown, a single or any other number of illumination units may be utilized in various other embodiments. In some embodiments, illumination units 120 and/or 150 produce a pencil beam rather than or in addition to a light sheet.

Optical arrangements of illumination units 120 and/or 150 provide illumination for a three-dimensional selective plane light-sheet microscopy. In some embodiments, these optical arrangements can dynamically vary: a cross section of a light sheet, a position of a waist of the light sheet along an axis of illumination, a position of the plane of the light sheet illumination, and/or a direction in which beam components extending within the light sheet are directed to the specimen. Further, as discussed herein, illumination unit 120/150 in conjunction with control system 160 and detection unit 130 is configured to allow for automatic changing of the field of view for optical microscope system 100, automatic adjusting of parameters for the illumination unit(s) 120/150 and/or detection unit 130. Thus, illumination units 120 and 150 and detection unit 130 may allow for rapid switching between macro views and micro views as well as rapid capturing of high resolution micro view and macro view images by detection system 170.

Motorized stages 180, 182, and 184 of stepper stage 105 may be used to move the specimen through the illumination plane of illumination units 120 and 150. Thus, the illumination sheet and the detection plane may remain in fixed positions while detecting various slices as stage 105 is moved in steps. The shown stepper stage 105 includes a support for specimen holder assembly 108, a z-stage that is moveable in the vertical z-direction via a motor 184, a slider, and motors 180 and 182 for x and y position adjustments of the stage in the horizontal plane, respectively. In some embodiments, a base configured to engage a specimen stage for supporting and orienting the specimen holder in an x-y direction is utilized. In some embodiments, a translational stage configured to engage the specimen holder in the z-direction is utilized.

Vertical optical microscope 106 shown in this example may be a trinocular fluorescence microscope equipped with detection unit 130 having an objective turret 132 including objectives 134 (of which multiple objectives are labeled only in FIG. 1A). In some embodiments, one or more objectives 134 include water dipping/immersion detection lens(es). However, in various other embodiments, other types of optical microscopes may be utilized. The optical detection path utilized to perform SPIM may utilize standard components of microscope 106, including its components in the optical detection path of detection unit 120. An output port of optical microscope 106 is coupled to detection system 170 that is utilized to acquire the SPIM image detected using the optical detection path of microscope 106. In some embodiments, a focus distance of the optical detection path can be dynamically varied and synchronized with the dynamic variance of the light sheet illumination to increase the resolution of a detected image of the SPIM specimen.

Figure 1E:
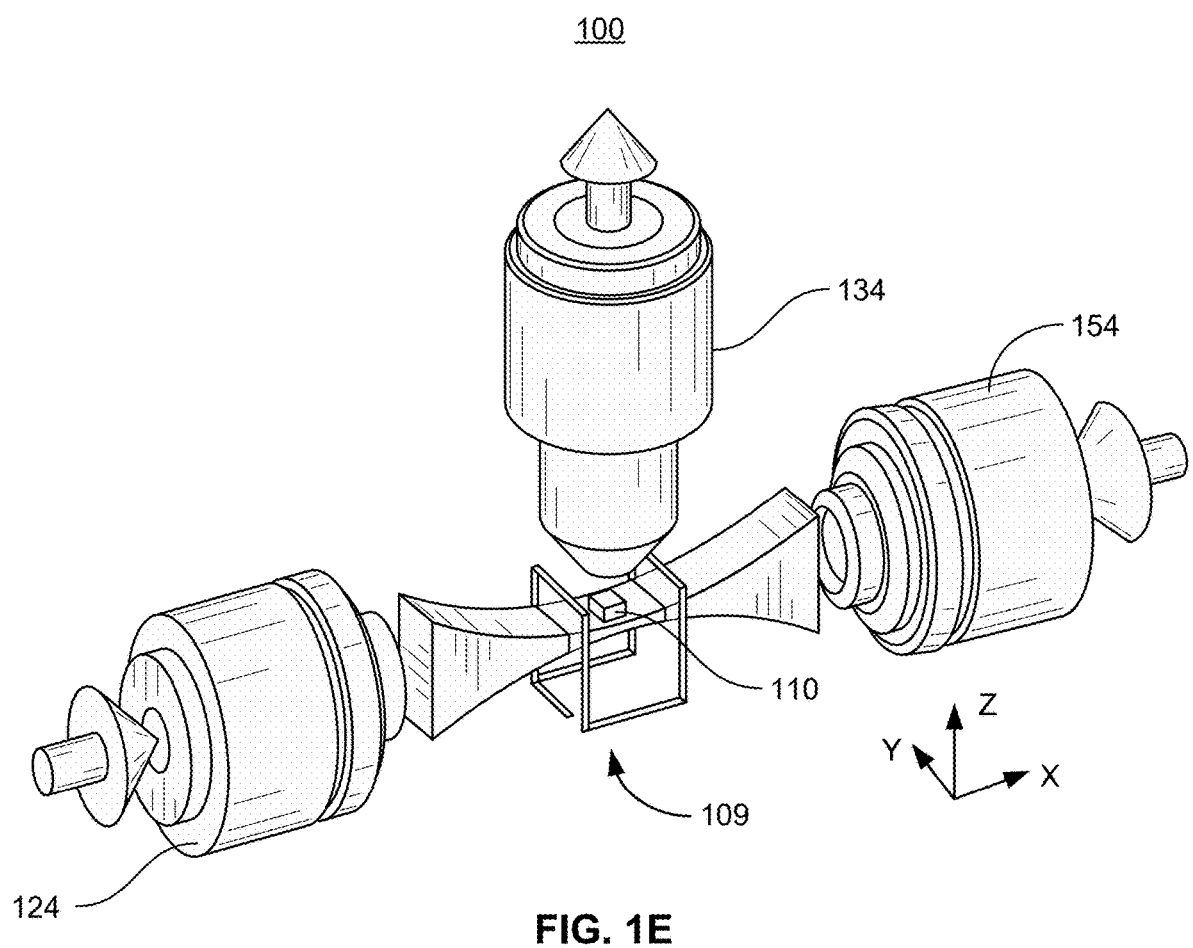

FIG. 1E is a diagram illustrating an example of illumination of a specimen in optical microscope system 100. In some embodiments, light-sheet microscopy system 100 uses a standard upright or inverted microscope, capable of illuminating a set of planes within a specimen, to detect the fluorescent emission coming from the illuminated plane, while at the same time producing the finest axial resolution at the largest region of interest. Specimen 110 is illuminated by illumination path objective 124 and illumination path objective 154. The illuminated specimen is observed via optical detection path objective 134. In some embodiments, detection path objective 134 is a part of microscope 106, illumination path objective 124 is a part of illumination unit 130, and illumination path objective 154 is a part of illumination unit 150 of system 100 of FIGS. 1A-1D. For example, the illumination units 130 and 150 are designed to work with fibered laser sources to produce a light sheet using cylindrical lenses. This allows direct imaging of an optical section with a single frame at full camera resolution. For better illumination plane homogeneity across the specimen, two illumination units are used on both sides of the specimen to compensate for the absorption effects of a thick specimen sample. In an alternative embodiment, a single illumination unit (e.g., illumination unit 130) is utilized. In some embodiments, the light sheet is projected using finite-infinite objectives, which can be adapted according to specimen size and detection magnification. In some embodiments, the illumination output of the objectives has a cross section of an elongated ellipse due to an assembly of optical elements in which the thin sheet of light is generated from one or many laser light sources. In another embodiment, the illumination output of the objectives has a cross section of an elongated rectangle. Lenses of objectives 124 and 154 are designed to optically compensate chromatic shift for the visible spectrum, thus allowing the simultaneous illumination at several wavelengths using a laser combiner for multi-fluorescence imaging.

Illumination path objectives 124 and 154 focus the laser light source to create a light sheet. However, as shown in FIG. 1E, due to the focusing of the light source by the lens of the objective, the light sheet is thinner at the focal point area (i.e., at the "waist") and becomes thicker away from the focal point area. A thinner light sheet allows for better image resolution and thus a uniformly thin light sheet is desired. Given the effects of the shown divergence, a light sheet within a limited range of thickness can be utilized in order to maintain a desired image resolution, thus limiting the field of view to the area of the light sheet within the thickness limit. However, in some cases it may be desirable to capture a specimen that is larger than the limited field of view. In some embodiments, a variable focus lens is utilized in illumination units to sweep the focal point across the specimen to create a thinner light sheet over a larger area of the light sheet. For example, focus distance of the illumination is automatically adjusted to move and sweep the focus across the specimen during image capture to automatically sweep the thinnest point of the light sheet across the specimen. By using a lens of variable focal distance in the illumination path of the optical arrangement, sweeping of the light sheet waist is made possible along the illumination direction. The lens of variable focal distance can vary between both negative and positive optical powers. This allows the acquisition of light sheet images of both the finest axial resolution and the largest field of view in one and the same frame.

By synchronizing lines of a rolling shutter of detection system 170 (e.g., a rolling shutter of a digital camera) with the sweeping position of the waist of the light sheet, a detected image of the specimen with a larger field of view can be generated without physically moving the specimen within the plane of the light sheet. The focus distance of the illumination may be adjusted electronically (i.e., electrically) and/or mechanically. For example, rather than relying on the mechanical motor mechanism that may introduce vibrations, the focal distance of an electronically or electrically tunable lens may be changed electrically (e.g., via electromagnets, piezoelectric element, current through a solution, etc.) without a use of a motor.

In some embodiments, a lens of variable focal distance is utilized in the detection path of the microscope. This optical device, allowing for fast remote focusing, is inserted into the detection path between the microscope's video output port and the digital camera, or between the microscope's detection path objective and the microscope's tube lens. The specimen, in its chamber, is set in a fixed position when the illumination plane and the detection plane move simultaneously through the specimen. As the specimen remains in a steady position, vibrations and perturbation issues are alleviated. Incidentally, specimen mounting and holding becomes much easier. Three-dimensional acquisition can be achieved at camera frame rate without being limited by mechanical constraints (e.g., 100 fps at 4 M pixels using a sensitive sCMOS camera).

In some embodiments, if required, a means for influencing the light sheet direction is utilized. Together with the sweeping of the light sheet waist, this means helps reduce or remove altogether shadows occurring within the observed specimen's plane. By integrating these scanning means, the light sheet system not only provides optical sectioning with optimal spatial resolution and signal to noise ratio, but also delivers unprecedented temporal resolution for 3D acquisition, addressing the needs for dynamic imaging of rapid biophysical processes.

Moreover, using control system 160, illumination unit(s) 120 and 150, and detection unit 130, particularly in conjunction with stage 105, illumination unit stage motors 102, 103, and 104, and sample stage motors 180, 184, and 184, optical microscope system 100 may allow for seamless and rapid changes in the field of view. For example, optical microscope system 100 may automatically change between macro views and micro views. More specifically, a user may request a change in the field of view for optical microscope system 100. For example, via GUI 162, the user may select a field of view that corresponds to a higher magnification (e.g., a micro view) or a different portion of the specimen being imaged. In some embodiments, the user may select a particular magnification. In response to the request, control system 160 (e.g., processor(s) 164) cause optical microscope system 100 to automatically change the field of view. In some cases, changing the field of view includes processor 164 determining the desired combination of illumination path objective 124 and detection path objective 134 for the desired magnification. The selected illumination path objective 124 is placed in the illumination path and the selected detection path objective 134 is placed in the detection path. For example, if the detection path objective is to be changed to provide the appropriate magnification, then revolving objective turret 132 is turned until the desired detection path objective 134 is in the detection path. Thus, magnification for the specimen may change.

Parameters for optical microscope system 100 are automatically adjusted to align an illumination plane of a light sheet of the optical microscope system and a detection plane of the optical microscope system. The adjustment of parameters to align the illumination plane with the detection plane is based at least on precalibrated parameters that correspond to the new field of view, the illumination path objective, and the detection path objective. For example, parameters for optical components in illumination unit 120 may be set to predetermined values to provide the light sheet at the desired height, pitch, and yaw for the detection path objective 134 being used, the location in the microscopy specimen in chamber 109, and the illumination path objective 124 being utilized. In some embodiments, the working distance of the selected detection path objective 134 may also be set to precalibrated values. This may be accomplished by changing the height of sample chamber 108, the height of the sample 110 within the sample chamber 108 or the height of detection path objective 134 being used. In some embodiments, processor(s) 164 also automatically perform fine focusing of the microscopy specimen. In addition, the chromaticity of the illumination path objective and/or the chromaticity of the detection path objective and/or a chromatic dispersion of the imaging solution in which the sample is embedded, may be accounted for.

Thus, optical microscope system 100 allows for faster switching between macro and micro imaging while achieving better image quality. More specifically, optical microscope system 100 allows synchronous switching between illumination path objectives 124 and/or detection path objectives 134 that enable the views, and automatically fine tunes illumination and/or detection paths to achieve better parfocality between various (macro and micro view) illumination path objectives, various detection path objectives, and between illumination and detection path objectives. In some embodiments, chromatic aberrations that may arise when illuminating samples using sources of laser light of several wavelengths may be dynamically (e.g., while collecting the images) offset in both macro and micro views by collecting images arising from fluorescent markers excited at separate wavelengths. Large, medium and small samples may be imaged with a range of objectives yielding smooth, seamless and quick transitions from macro views to micro views and vice versa.

Figure 2A:
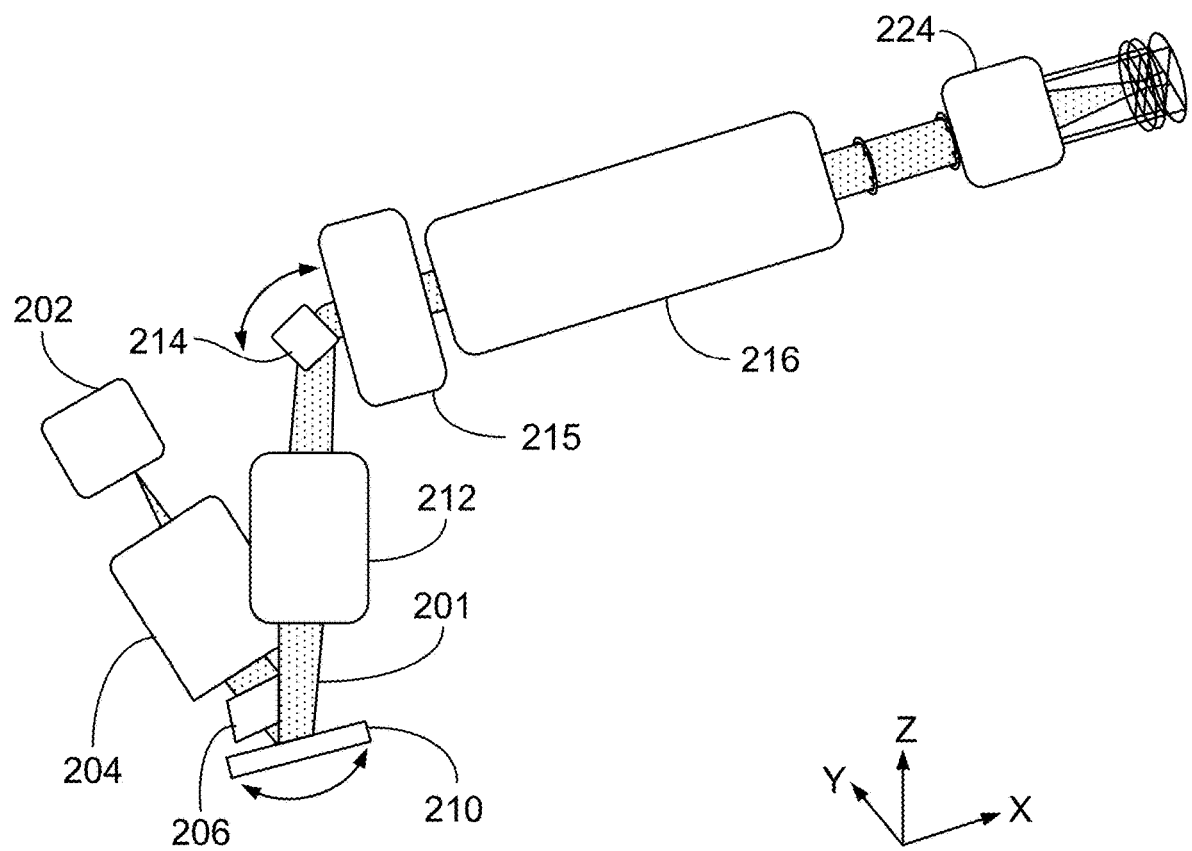
FIGS. 2A-2C depict an embodiment of an illumination path and optical components for the illumination path.
Figure 2B:
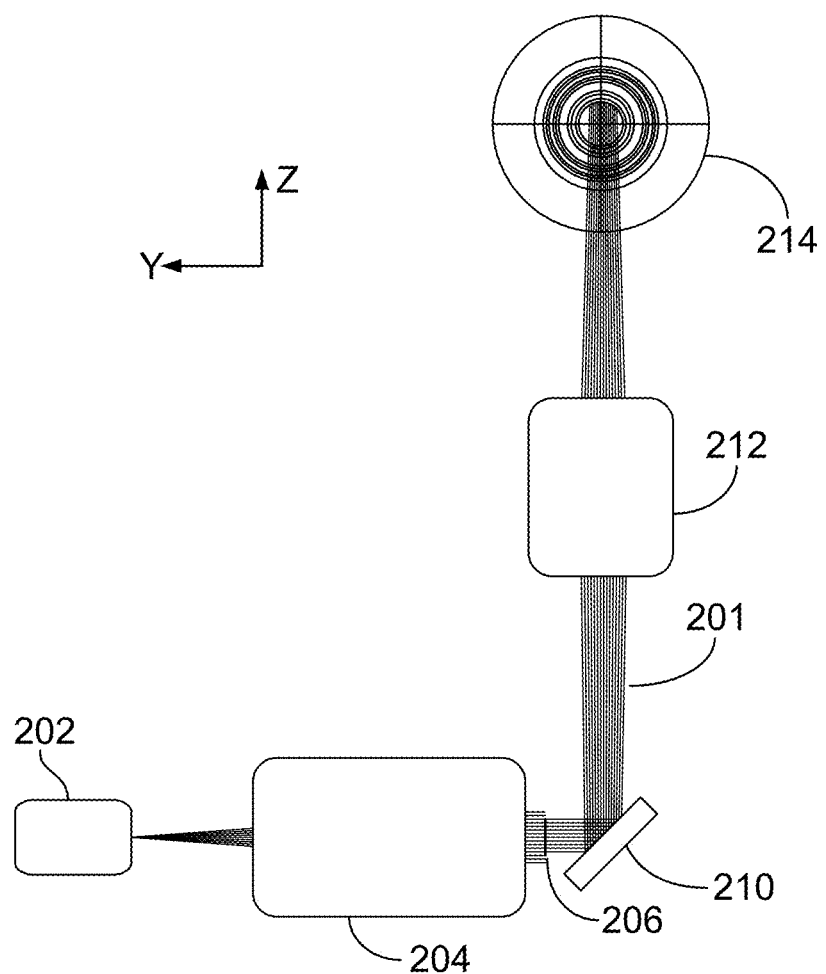
Figure 2C:
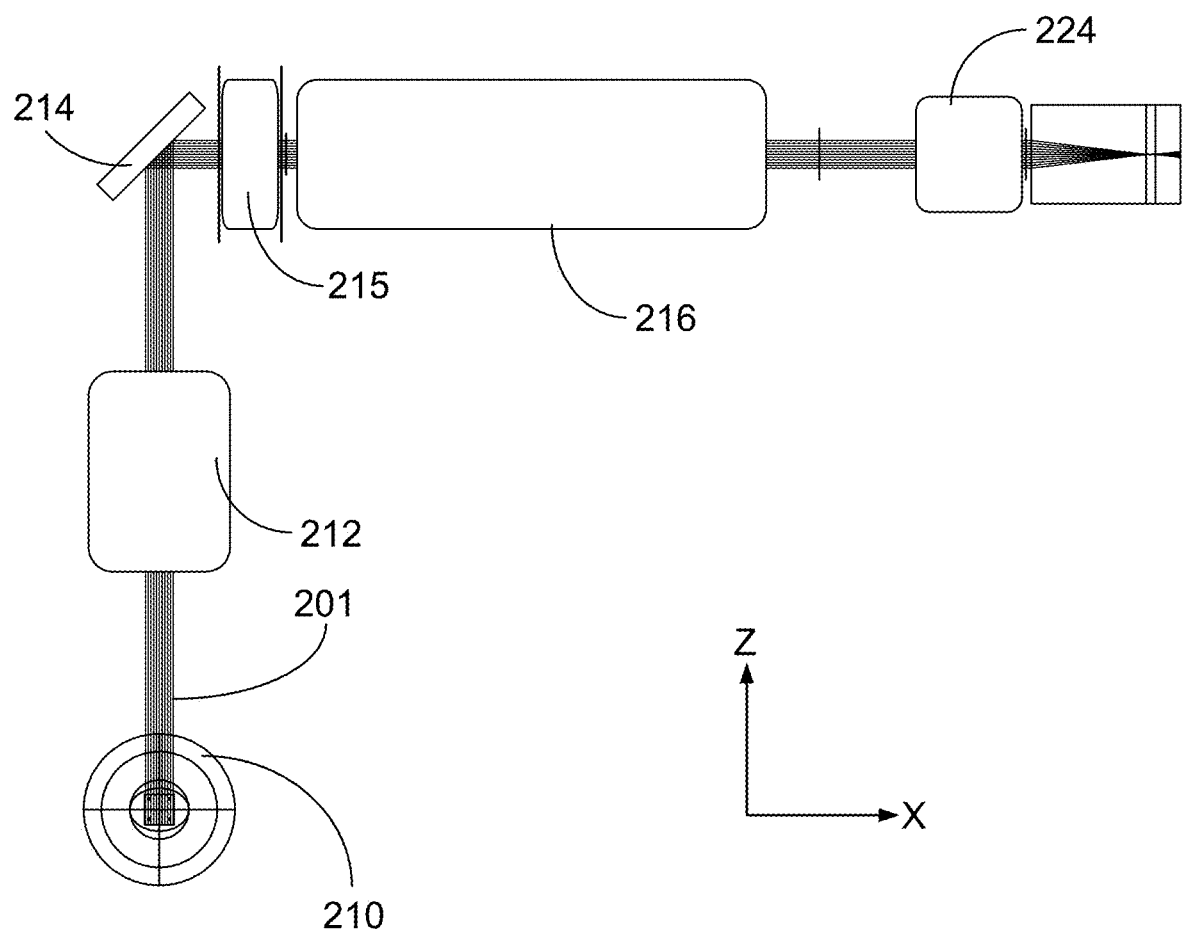

FIGS. 2A-2C depict views of an embodiment of illumination unit 200 providing an illumination path 201 and optical components of the illumination unit. Illumination unit 200 may be considered to be analogous to illumination unit(s) 120 and/or 150. For example, the shown optical components are included and arranged in the shown relative order in illumination component 120 of FIGS. 1A-1E. In some embodiments, two illumination units are utilized and the shown optical components are included and arranged in the corresponding relative order (e.g., mirrored on Z-Y plane from shown arrangement) in illumination component 150 of FIGS. 1A-1E. Not all components of the illumination unit have been shown. FIG. 2A shows a perspective view. FIG. 2B shows a side view. FIG. 2C shows another side view. The Z-direction axis is the vertical axis.

Illumination path 201 shows a path of light from light source 202 to a specimen in a specimen chamber as the light is manipulated by optical components to produce a light sheet to illuminate the specimen. An example of light source 202 is a laser light source that produces a laser light (e.g., laser beam). The light (e.g., light bundle of coherent light) from laser source 202 passes through collimator 204 that aligns the beams of the light using one or more optical lenses. Collimator 204 includes and/or is followed by one or more components 206 with horizontal and vertical slits with adjustable opening widths that allow adjustment of the aperture and field stops (e.g., optical diaphragm(s)). The adjustment of the vertical opening width implements the field stop that influences the width of the light sheet, while the adjustment of the horizontal opening implements the aperture stop that influences the length of the waist (e.g., Length=2×sqrt(2)×Rayleigh length) and the height of the waist of the light sheet. One or more utilized diaphragms (e.g., included in or downstream of the collimator and realizing field and/or angular aperture stops for the light sheet) can be arranged on a changer wheel or maintained in place. The widths of apertures of the diaphragms may be set manually or automatically.

Next, the light following illumination path 201 is deflected by horizontal optical deflection component 210. An example of horizontal optical deflection component 210 is an oscillating mirror or a galvo mirror. When optical deflection component 210 is oscillated, it generates scanning horizontal movements of the light sheet (e.g., to reduce shadows in illumination of the specimen). The oscillation of horizontal optical deflection component 210 includes a back and forth rotation (e.g., vibration) about a central rotational axis (e.g., on the x-axis). This oscillation may be achieved via a piezoelectric, mechanical, and/or other electromechanical component. Horizontal optical deflection component 210 is positioned downstream of collimator 204 and diaphragms realizing field and angular aperture stops for the light sheet. As the result of oscillating movement of horizontal optical deflection component 210, the light beam components of the light sheet strike the specimen in a specimen chamber at alternating directions many times so as to reduce or remove altogether the shadows caused by opaque specimen substances within the illuminated light sheet plane that might appear in the path of any individual beam component.

Then the light following illumination path 201 passes through aspherical component 212 that includes one or more aspherical optical lens elements (e.g., generates a light bundle with an elliptic cross section). A cylindrical lens, for example, can be used as an aspherical optical element.

The light following illumination path 201 is deflected by a vertical optical deflection component 214. An example of vertical optical deflection component 214 is an oscillating mirror (e.g. a galvo mirror including a galvanic motor with a mirror mounted on the shaft). The oscillation of vertical optical deflection component 214 includes a back and forth rotation (e.g., vibration) about a central rotational axis (e.g., on the y-axis). This oscillation may be achieved via a piezoelectric, mechanical, and/or other electromechanical component. When optical deflection component 214 is oscillated, it generates scanning vertical movements of the light sheet. For example, to achieve a scanning vertical (e.g., perpendicular to the plane of the light sheet) movement of the light sheet plane, vertical optical deflection component 214 is positioned downstream of aspherical component 212 generating a light bundle with an elliptic cross section. As the result of linear or oscillating movement of vertical optical deflection component 214, the light beam of the light sheet strikes the specimen at a series of planes thus achieving optical slicing of the specimen, allowing collection of fluorescent emission emitted in consecutive slices within the specimen, by a detector (e.g., digital camera), or to observe the slices in real time directly with an observation lens arrangement (e.g., binoculars). Thus vertical optical deflection component 214 enables automatic movement (e.g., scan) of the vertical position (e.g., z-axis direction) of the light sheet illuminating the specimen.

Then the light following illumination path 201 passes through variable focus lens component 215. An example of variable focus lens component 215 includes an electronically tunable lens with an electronically variable focal distance (e.g., changes focus via electromagnets, piezoelectric element, current through a solution, etc.). Variable focus lens component 215 can be utilized to sweep the focal point across the specimen to create a thinner light sheet over a larger area of the light sheet. For example, focal distance of the illumination lens is automatically and/or continually adjusted/swept across a range of focal distance values to move the focus of the lens across the width of the specimen during image capture to sweep the thinnest point of the light sheet across the specimen. The focal distance of variable focus lens component 215 can be dynamically and automatically tuned/scanned to change the diopter of variable focus lens component 215 in a range that includes both positive and negative diopter values (e.g., between both negative and positive optical powers). For example, variable focus lens component 215 can act both as a converging and diverging lens by electronically adjusting a parameter of variable focus lens component 215. By introducing a lens of variable focal distance into the illumination path of the optical arrangement, sweeping of the light sheet waist is made possible along the illumination direction. Thus, variable focus lens component 215 enables automatic movement (e.g., scan) of the horizontal side to side position (e.g., x-axis direction) of the waist of the light sheet illuminating the specimen. In some embodiments, variable focus lens component 215 is positioned at or close to planes optically conjugated with an aperture of illumination path objective 224.

Then the light following illumination path 201 passes through optical relay lens component 216. Optical relay lens component 216 includes optical lenses, extends along the illumination path, and directs the light bundle to the back aperture of illumination path objective 224. Using one or more optical lenses, illumination path objective 224 emits and focuses the light sheet on the specimen in a specimen chamber, which is set to emit fluorescent light.

As the result of movement (e.g., linear, oscillating, or other) of the focus of optical components with variable focusing distance, the position of the waist of the light sheet is altered, which results in the illuminating of the substances of the specimen with the light sheet of the thinnest cross section over the widest range along the axis of illumination. This makes it possible to maintain the as fine as possible axial resolution of the light sheet microscopy (e.g., for detection path objectives with low to medium numerical aperture (NA), it is determined by the thickness of the light sheet waist) and/or discard the signals from the neighboring slices of the specimen (e.g., for detection path objectives with high NA), while imaging at as large as possible a region of interest within the specimen, and, if required, to achieve reduction in shadows occurring within the observed specimen plane as a result of the light sheet illumination.

Moreover, an optical microscope system that performs SPIM, such as optical microscope system 100, may utilize optical components in illumination unit 200 to automate and facilitate field of view changes. Such a field of view change may include the use of higher magnification objectives (e.g. from a 4× detection path objective to a 25× detection path objective and/or from a 5× illumination path objective 224 to a 10× illumination path objective 224). A portion of the current field of view (a section of the part of the microscopy specimen currently imaged) may be desired to be imaged at higher magnification. The detection path objective (not shown in FIGS. 2A-2C) and/or illumination path objective 224 may be changed to provide the desired magnification. Such a change may be accomplished by rotating a turret (e.g., detection path objective turret 132 and/or illumination path objective turret 122). This selection of objective(s) via turret(s) may be made automatically or manually. The detection path objective and illumination path objective 224 have been precalibrated. Consequently, the desired parameters for ensuring parfocality between previous and new illumination path objectives 224 and between previous and new detection path objectives are known and may be automatically set. Similarly, the desired parameters for parfocality between the new illumination path objective 224 and the new detection path objective are known and may be automatically set. As a result, the light sheet plane for illumination unit 200 using the new illumination path objective 224 may be automatically aligned with the detection plane of the new detection path objective. Similarly, the light sheet and detection planes may be automatically set to the desired height within the sample. In some embodiments, these goals may be accomplished by setting parameters of the illumination unit stage motors 102, 103, and 104, of the deflection component 214 and/or variable focus lens component (e.g., electrically tunable lens) 215 to precalibrated values. As a result, deflection component 214 and/or variable focus component 215 direct(s) the illumination path 201 to illuminate the specimen at the desired location and such that the light sheet plane and detection plane coincide at the desired portion of the specimen. Similarly, the height of a detection path objective may be set to precalibrated values such that the detection plane of detection path objective 134 coincides with the light sheet plane at the desired portion of the specimen. In some embodiments, other parameters for other optical components may be set to precalibrated values to obtain the desired parfocality. The image may be further autofocused to provide a sharper image (e.g. compensating for optical properties of a solution in which the microscopy specimen may reside). Consequently, the benefits of optical microscope system 100 may be achieved. In particular, switching between macro and micro views may be facilitated and high quality images more rapidly acquired.

Figure 3:
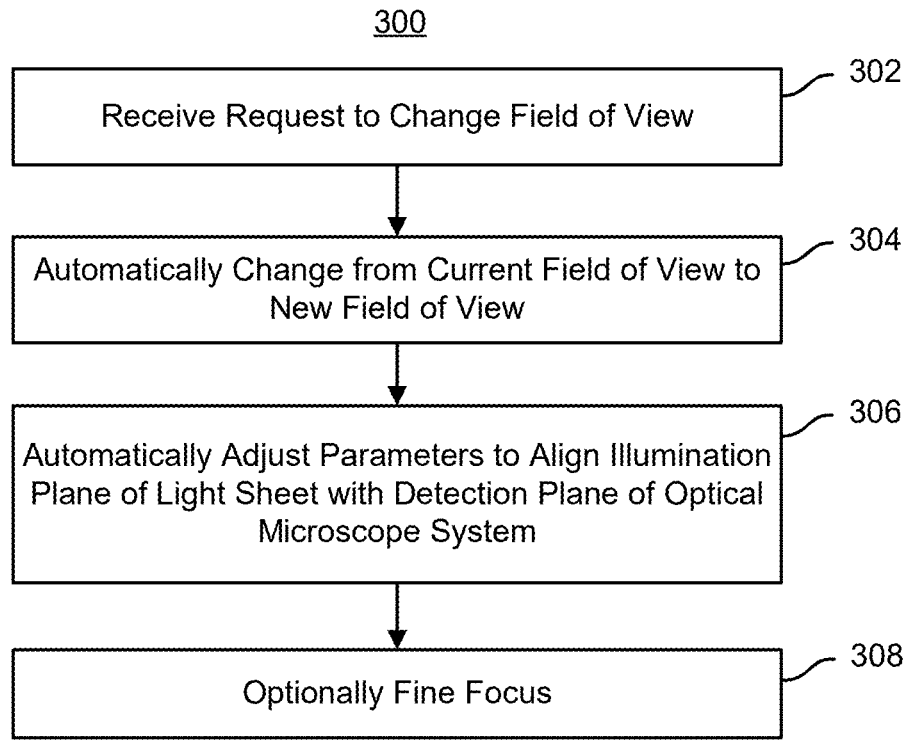
FIG. 3 is a flow-chart depicting an embodiment of a method for automatically changing the field of view in an optical microscope system.

FIG. 3 is a flow-chart depicting an embodiment of method 300 for automatically changing the field of view while improving image quality in an optical microscope system, such as a SPIM. Method 300 may include other and/or additional steps or substeps. Further, some steps and/or substeps may occur in another order, including in parallel. Method 300 is discussed in the context of systems 100 and 200. However, other systems may be used in some embodiments.

A request to change a field of view is received, at 302. In some embodiments, the request is received via a GUI or other interface. For example, a user may select magnification(s) and/or combination(s) of objectives via the interface. In some embodiments, the user may use a mouse and/or touchpad to define an area of the microscopy specimen being imaged that is desired to be viewed.

The optical microscope system automatically changes from a current field of view to a new field of view in response to the request, at 304. If the user has selected an area desired to be viewed, then 304 may include the control system selecting the appropriate magnification(s) of objective(s) such that the area selected is magnified to fill or substantially fill the field of view. In some embodiments, the specimen holder may be moved so that the desired portion of the specimen is in the detection path.

The parameters for the optical microscope system are automatically changed to align the illumination plane of the light sheet with the detection plane of the optical microscope system, at 306. Also at 306, the parameters are set such that the desired portion of the microscopy specimen coincides with the illumination and detection planes. At 306, the parameters are set based on precalibrated parameters for the new field of view, for the illumination path objective being used, and for the detection path objective being used. In some embodiments, therefore, the parameters are set to precalibrated parameters for the combination of the illumination and detection path objectives used for the new field of view. For example, if the illumination path objective has been changed at 304, then the parameters for the illumination unit stage motors 102, 103, and 104 for the illumination path may be adjusted at 306. Similarly, the parameters for the sample stage motors 180, 182 and 184 may be adjusted based on the illumination and detection path objectives at 306. Thus, the positions of the motorized stages/motors 102, 103, and 104 and the positions of the sample stage motors 180, 182 and 184 may be updated at 306. In some embodiments, parameters for other or additional components may be set at 306.

The desired portion of the microscopy specimen may be at or near being in focus after 306 is completed. An automatic fine focus may optionally be performed, at 308. For example, the parameters for the deflection component 214 and/or for the electrically tunable lens in the illumination path 215 and/or for the electrically tunable lens in the detection path may be updated at 308. Thus, the angle of the deflection component 214, the focal length of the electrically tunable lens in the illumination path 215 and the focal length of the electrically tunable lens in the detection path may be updated at 308. Thus, an automatic fine focus may optionally be performed, at 308. Consequently, the focused, desired field of view may be imaged.

For example, a user may request a change of the field of view using GUI 162. The request is received by control system 160, at 302. For example, the user may select a portion of the image to be viewed at higher magnification. In response, processor(s) 164 determine the appropriate illumination path objective 124 and detection path objective 134. The field of view is automatically changed using control system 160, at 304. For example, turret(s) 122 and/or 132 are rotated to place the appropriate illumination path objective 124 in the illumination path and/or to place the appropriate detection path objective 134 in the detection path. Parameters for optical microscope system 100 are also updated based on the new field of view and the objectives used for the new field of view, at 306. For example, the positions of the illumination unit stage motors 102, 103, and 104 may be adjusted based on precalibrated values for the combination of illumination path and detection path objectives. Similarly, the parameters for the sample stage motors 180, 182, and 184 may be adjusted based on precalibrated values for the combination of illumination path and detection path objectives and on the location of the portion to be viewed at higher magnification, in the image. A fine focus may be optionally performed, at 308. For example, the angle of the deflection component 214, the focal length of the electrically tunable lens in the illumination path 215 and the focal length of the electrically tunable lens in the detection path may be updated at 308.

Using method 300, the desired parameters for parfocality between previous and new illumination path objectives, between previous and new detection path objectives, and between the new illumination path objective and the new detection path objective are automatically set. As a result, the light sheet plane may be automatically aligned with the detection plane of the new detection path objective. The light sheet and detection planes may be automatically set to the desired height within the sample to illuminate and image the selected part of the microscopy specimen. The image may be automatically fine focused. Consequently, switching between fields of view (e.g., macro and micro views) may be facilitated and high quality images more rapidly acquired.

Figure 4:
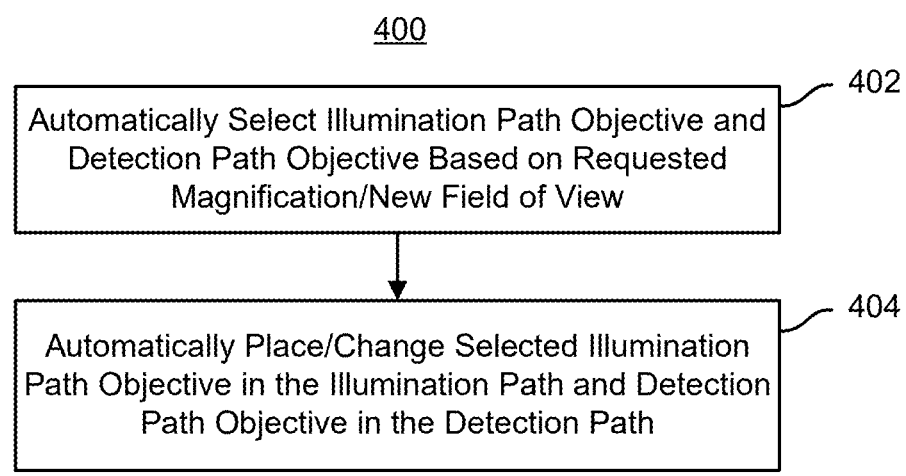
FIG. 4 is a flow-chart depicting an embodiment of a method for automatically changing the field of view in an optical microscope system.

FIG. 4 is a flow-chart depicting an embodiment of method 400 for automatically changing the field of view in an optical microscope system, such as a SPIM. Method 400 may include other and/or additional steps or substeps. Some steps and/or substeps may occur in another order, including in parallel. Method 400 is discussed in the context of systems 100 and 200. However, other systems may be used in some embodiments. In some embodiments, method 400 is used for 304 of method 300. Thus, the new field of view has already been selected by the user. The new field of view also has a different magnification than the current field of view. For example, method 400 may be used to change from a macro view to a micro view or vice versa.

The illumination path objective and the detection path objective are automatically selected, at 402. The selection is based upon the request received. If the user has selected an area desired to be viewed, then 402 may include the control system selecting the appropriate magnification(s) of objective(s) such that the area selected is magnified to fill or substantially fill the field of view. If the magnification has been identified by the request, then 402 may include determining the appropriate illumination path objective and detection path objective that will provide the selected magnification (or provide the closest match). In some embodiments, the selection in 402 is based upon predetermined characteristics of the objectives. For example, Table 1 indicates the illumination and detection path objectives used for various resolutions that may be considered to correspond to macro views and micro views. The information in Table 1 may be used to select the desired objectives. Note that in Table 1, X corresponds to the magnification, NA corresponds to the numerical aperture, RI corresponds to the refractive index and AIR corresponds to air (RI=1), the medium for which the objective is designed. For example, if the desired axial×lateral resolution is or close to 1 μm×1.02 μm, then the 10× illumination path objective and the 10× detection path objective are identified and selected at 402.

TABLE 1

| View | Illumination (X/NA/RI) | Detection (X/NA/RI) | Axial × Lateral Resolution |
|---|---|---|---|
| Macro | 2X/0.06NA/AIR | 2X/0.15/1.33-1.52 | 4 μm × 2.03 μm |
|  | 5X/0.14NA/AIR | 4X/0.28/1.33-1.53 | 2 μm × 1.09 μm |
| Micro | 10X/0.28NA/AIR | 10X/0.3/1.33 | 1 μm × 1.02 μm |
|  | 10X/0.28NA/AIR | 10X/0.6/1.33-1.53 | 1 μm × 0.51 μm |
|  | 20X/0.42NA/AIR | 20X/0.5/1.33 | 0.5 μm × 0.61 μm |
|  | 20X/0.42NA/AIR | 25X/0.95/1.33-1.41 | 0.5 μm × 0.32 μm |
|  | 20X/0.42NA/AIR | 25X/1.00/1.41-1.52 | 0.5 μm × 0.31 μm |

The selected illumination path objective and detection path objective are placed in the illumination path and detection path, respectively, at 404. Thus, 404 may include the control system managing placement of the desired illumination and detection path objectives in the illumination and detection paths. For example, if both illumination and detection path objectives are to be changed in order to provide the new field of view, then the control system may rotate the corresponding turrets such that the new illumination and detection path objectives are in the paths of light. If either the illumination path objective or the detection path objective is to be changed to provide the new field of view, then only the turret corresponding to the objective to be changed is rotated.

For example, a user may have requested a change of the field of view from axial×lateral resolution 2 μm×1.09 μm to 1 μm×0.51 μm using GUI 162. At 402, processor(s) 164 determines that the illumination path objective 124 is to be changed from the 5×/0.14 NA/AIR objective to the 10×/0.28 NA/AIR objective and that the detection path objective 134 is to be changed from the 4×/0.28/1.33-1.53 objective to the 10×/0.6/1.33-1.53 objective. At 404, control system 160 ensures that turret(s) 122 and/or 132 are rotated to place the appropriate illumination path objective 124 in the illumination path and to place the appropriate detection path objective 134 in the detection path. Thus, the field of view for optical microscope system 100 is automatically changed.

Using method 400, the desired combination of illumination path objectives and detection path objectives may be automatically determined and used in the optical microscope system. As a result, the field of view may be rapidly and easily changed. Consequently, operation of the optical microscope system may be improved.

Figure 5:
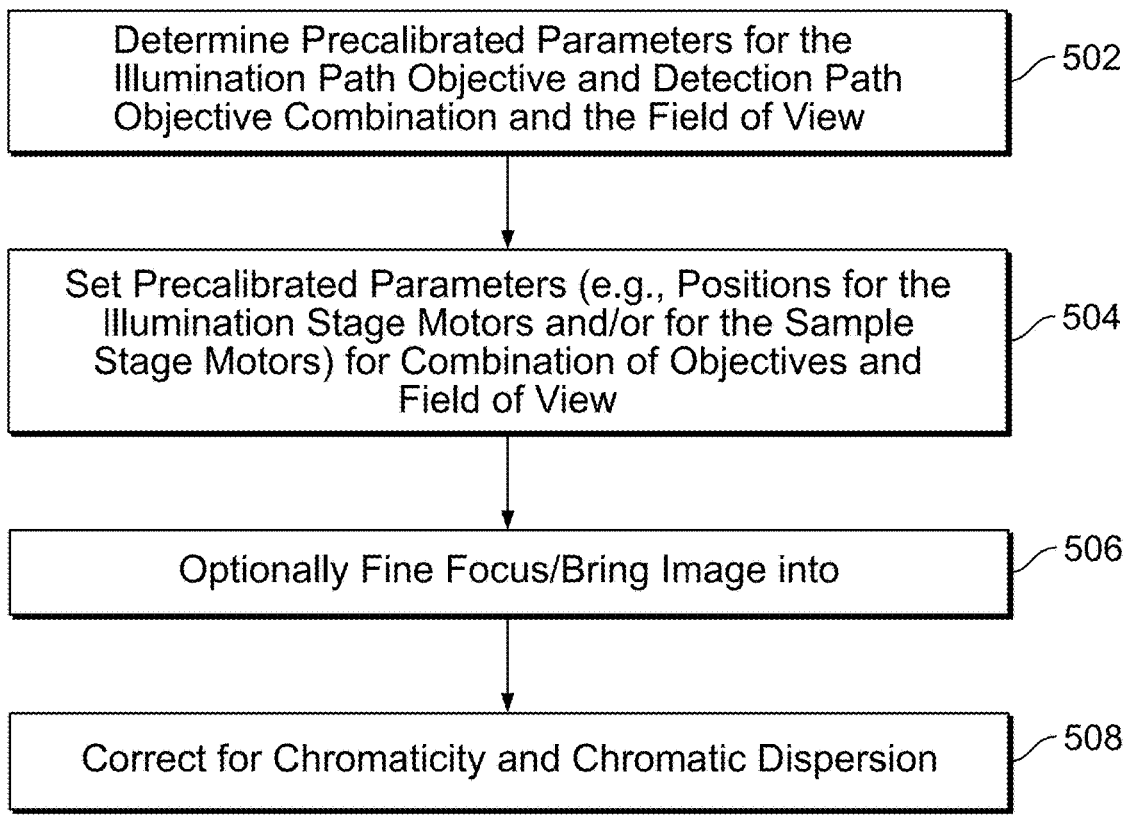
FIG. 5 is a flow-chart depicting an embodiment of a method for automatically setting parameters for a change in the field of view of an optical microscope system.

FIG. 5 is a flow-chart depicting an embodiment of method 500 for automatically adjusting parameters in an optical microscope system, such as a SPIM. Method 500 may include other and/or additional steps or substeps. Further, some steps and/or substeps may occur in another order, including in parallel. Method 500 is discussed in the context of systems 100 and 200. However, other systems may be used in some embodiments. In some embodiments, method 500 is used for 306 of method 300. Thus, the new field of view has already been selected by the user and the combination of illumination path objectives and detection path objectives has been identified. In addition, the appropriate illumination path and detection path objectives may already be placed in the corresponding light paths.

The parameters for the optical microscope system for the new field of view are determined, at 502. In some embodiments, 502 includes searching a database including precalibrated parameters for the illumination unit(s) and detection unit(s) for a specific, selected combination of lenses. For example, various positions may be identified for the illumination unit stage motors, for the sample stage motors, and/or for the sample rotation motor. In some embodiments, the precalibrated parameters correspond to factory settings. In some embodiments, some or all of the precalibrated parameters may be updated. For example, a precalibration may be performed on site for specific optical microscope systems and/or specific microscopy samples.

The parameters for the optical microscope system are set to precalibrated values, at 504. The precalibrated parameters are based on the new field of view, the illumination path objective, the detection path objective, and/or other components of the optical microscope system. For example, the parameters for optical components in illumination unit(s) and/or detection unit(s), parameters for other characteristics of illumination unit(s) and/or detection unit(s), and/or parameters for the specimen holder assembly (e.g. the height and/or location in the xy plane of the microscopy specimen) may be set to precalibrated values. Thus, at 504, the parameters are set such that the illumination plane of the light sheet, the detection plane of the detection unit are aligned. These precalibrated values of the parameters may be determined based on a prior alignment/calibration procedure that is performed for the particular optical microscope system. In some embodiments, 504 also includes aligning the desired portion of the microscopy specimen with the illumination and detection planes. Thus, after 504 is completed, the desired portion of the microscopy specimen may be at or near being in focus.

An automatic fine focus may optionally be performed, at 506. Consequently, the focused, desired field of view may be imaged. 506 is, therefore, analogous to 308. In addition, the chromaticity of the illumination and detection path objective (s) and the chromatic dispersion may be accounted for, at 508. Thus, the image for the new field of view may be in focus and high quality images of the microscopy specimen captured.

For example, the desired illumination path objective 124 and detection path objective 134 for the new field of view have been selected and, in some embodiments, placed in the illumination and detection path. Processor 164 may determine the corresponding precalibrated parameter values via a search of memory 166, calculations, and/or in another manner. For example, precalibrated values corresponding to the positions of the illumination unit stage motors 102, 103, and 104 may be determined for the combination of illumination path and detection path objectives, at 502. Similarly, the precalibrated parameters for the desired positions of the x-, y-, and z-axis sample stage motors 180, 182 and 184 may be identified at 502 for the selected field of view. In some embodiments, the precalibrated parameters corresponding to the height of the selected detection path objective 134 and/or location of the specimen chamber 109 are determined at 502. Also at 502, the precalibrated parameters for the sample rotation motor 186 may be determined. In some embodiments, an electrically tunable lens, galvo mirror, and/or analogous component may be placed in the detection path. In such embodiments, 502 determines the precalibrated parameters for these optical components. The parameters are set to precalibrated values, at 504. These precalibrated values may be determined at least in part on previous calibrations (e.g. using the wedge as described below)

performed for system 100. A fine focus and chromaticity correction may be optionally performed, at 506 and 508.

The particular set of parameters achieved in method 500 for a particular optical microscope system may not be readily pre-determined for multiple optical microscope systems. Thus, aligning the detection plane with the illumination plane with any given set of predetermined parameters may be challenging. However, the parameters may be determined for each optical microscope system. The exact positions of the illumination unit stage motors 102, 103, and 104 and the x-, y-, and z-axis sample stage motors 180, 182, and 184 depend on their overall system response (i.e. a response of a complex system to external commands), on the exact positions within the mechanical structure of the specific system being used (e.g. where exactly they are attached with screws to the structure, etc.). The alignment between the light sheet illumination plane and the detection plane may be reproduced for a particular system. This common plane of the light sheet illumination plane and detection plane can be selected to be at a variety of locations, to within at least the focal depth of the detection objective which defines the thickness of the detection plane (which is rather a slab than a plane—i.e. planes described herein may be slabs in practice). To arrive at this alignment, the positions of the illumination unit stage motors 102, 103, and 104 and of the x-, y-, and z-axis sample stage motors 180, 182 and 184 are determined automatically (e.g. in the method 500) by using a certain criteria, such as sharpness of the image of either the biological sample, or of the calibration sample (e.g. of the calibration wedge, described below). So, the alignment of the two planes exist, is achievable (by e.g. pursuing a goal of maximizing a certain criterium, such as sharpness, and/or calibration of the system), reproducible, and may be performed automatically.

Using method 500, the desired parameters for parfocality between previous and new illumination path objectives, between previous and new detection path objectives, and between the new illumination path objective and the new detection path objective are automatically determined and set. As a result, the light sheet plane may be automatically aligned with the detection plane of the new detection path objective. The light sheet and detection planes may be automatically set to the desired height within the sample to illuminate and image the selected part of the microscopy specimen. Consequently, switching between fields of view (e.g., macro and micro views) may be facilitated and high quality images more rapidly acquired.

Figure 6:
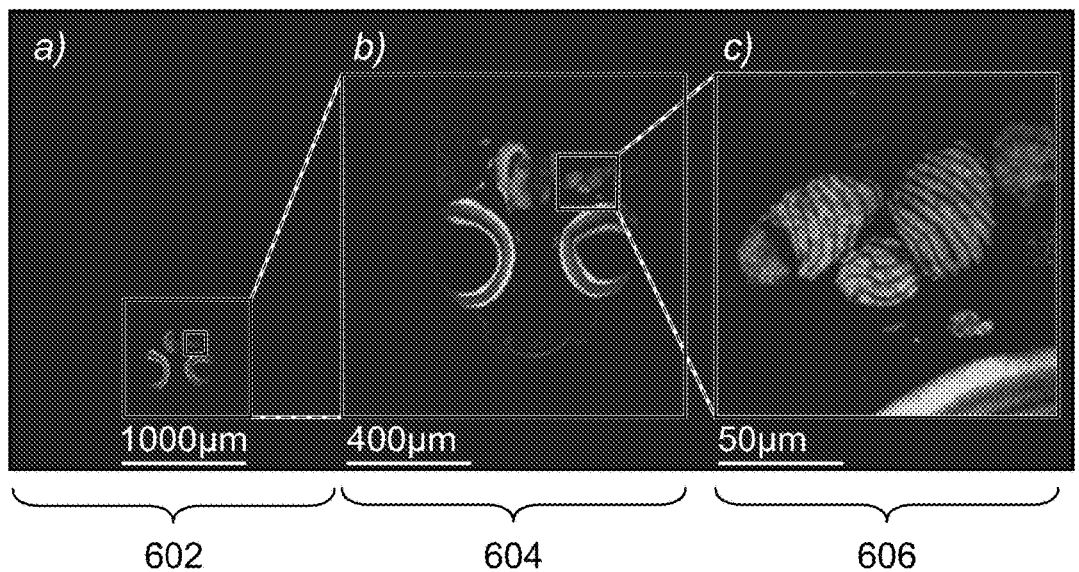
FIG. 6 depicts an embodiment of changes in the field of view between macro views and micro views.

FIG. 6 depicts an embodiment of changes in the field of view between macro views and micro views. The views depicted in FIG. 6 correspond to optical microscope system 100 and methods 300, 400, and 500. View 602 is a macro view. Also illustrated in macro view 602 are rectangles corresponding to micro views 604 and 606. First micro view 604 may be considered an intermediate view having a magnification between that of macro view 602 and micro view 606. Micro view 606 is indicated by a rectangle in micro view 604. To achieve micro view 604 from macro view 602, the user may select the larger corresponding rectangle in macro view 602. Thus, optical microscope system 100 receives the request to change the field of view (and thus magnification) to resolve a smaller portion of the sample. Using methods 300, 400, and 500, the appropriate illumination and detection path objectives are identified. If not already in use, the illumination and detection path objectives are placed in the illumination path and the detection path, respectively. The illumination plane of the light sheet and the detection plane of the detection path objective are automatically aligned using method 300 and/or 500. In addition, fine focusing may be performed. Thus, micro view 604 is rapidly and easily obtained from macro view 602 (and vice versa). Similarly, micro view 606 may be obtained from micro view 604 by the user selecting the corresponding rectangle in micro view 604. Thus, optical microscope system 100 receives the request to change the field of view (and thus magnification) to resolve a smaller portion of the sample. Using methods 300, 400, and 500, the appropriate illumination and detection path objectives are identified. The appropriate illumination and detection path objectives are placed in the illumination path and the detection path, respectively. The illumination plane of the light sheet and the detection plane of the detection path objective are automatically aligned using method 300 and/or 500. In addition, fine focusing may be performed. Thus, micro view 606 is rapidly and easily obtained from micro view 604 (and vice versa). In some embodiments, a user may obtain micro view 606 from macro view 602 by selecting the smaller, corresponding rectangle. Thus, a user can rapidly and easily change between views.

FIGS. 7A-7B depict another embodiment of changes in the field of view. FIG. 7A depicts a microscopy specimen 701 in specimen chamber 709. In the embodiment shown, a user desires to image field of view A and field of view B. However, as indicated in FIG. 7B, light path 710 undergoes refraction in the medium in which the specimen is retained in specimen chamber 709. Thus, without more alignment, region B will not be in focus. Optical microscope 100 may employ precalibrated parameters to change from field of view A to field of view B in a manner analogous to changes in fields of view 602, 604, and 606. Thus, changes in field of view between region A and region B may be accomplished automatically, rapidly and seamlessly.

Figure 8A:
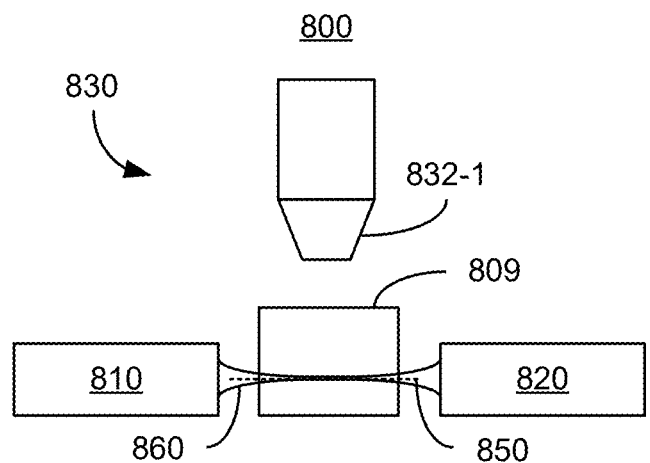
FIGS. 8A-8C depict an embodiment of a system that automatically sets parameters for the optical microscope system.
Figure 8B:
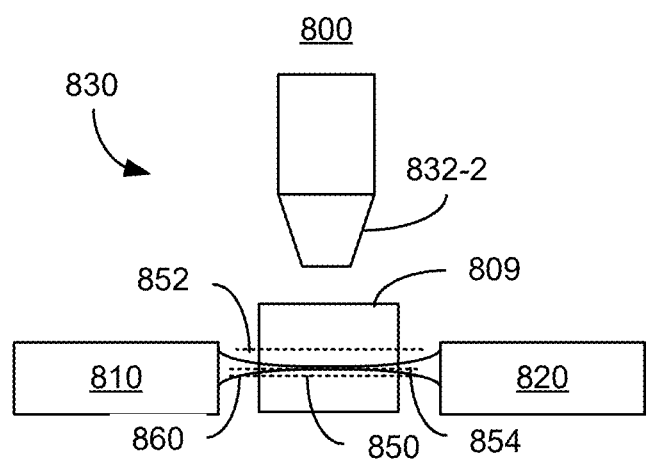
Figure 8C:
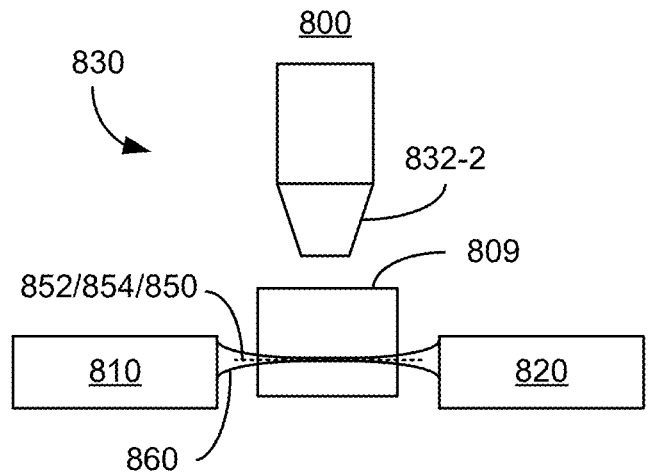

FIGS. 8A-8C depict a portion of an embodiment of optical microscope system 800 that automatically sets parameters using method(s) 300, 400, and/or 500. Thus, optical microscope system includes illumination units 810 and 820, detection system 830, and specimen chamber 809. Also shown is light path 860. FIG. 8A depicts optical microscope system 800 for a first field of view of the specimen. In the embodiment shown, detection path objective 832-1 is used. Light path 860 has illumination plane 850 for the light sheet. Further, the detection plane for detection path objective 832-1 is aligned with the light sheet. Consequently, the specimen is in focus.

FIG. 8B depicts a system after the field of view is changed (e.g., via 304 and/or 402 and 404). Thus, a new objective 832-2 is placed in the detection path. In some embodiments, illumination path objective(s) in illumination unit(s) 810 and/or 820 may be changed. Detection path objective has detection plane 852, while illumination units 810 and 820 have an illumination plane 854. Thus, the detection plane 852 of detection objective 832-2 no longer aligns with the illumination plane 854. In addition, detection plane 852 and illumination plane 854 do not align with plane 850 for the first field of view depicted in FIG. 8A.

Using methods 300 and/or 500 the parameters for illumination unit(s) 810 and/or 820 and detection unit 830 are updated to precalibrated values based on detection path objective 832-2 and components of illumination units 810 and 820. Thus, the detection plane 852 of detection objective 832-2 and the illumination plane 854 of illumination units 810 and 820 are aligned. Further, detection plane 852 and illumination plane 854 are aligned with the plane 850 from the first field of view. Additional fine focusing may also be performed. Thus, using methods 300, 400, and/or 500, system 800 can not only automatically change the field of view, but also automatically provide improved images.

Figure 9A:
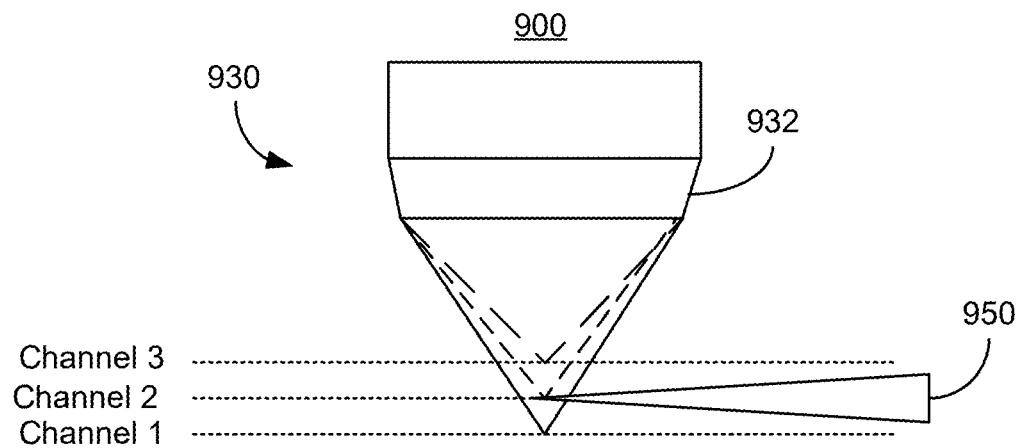
FIGS. 9A-9B depict an embodiment of chromatic offset correction for an optical microscope system.
Figure 9B:
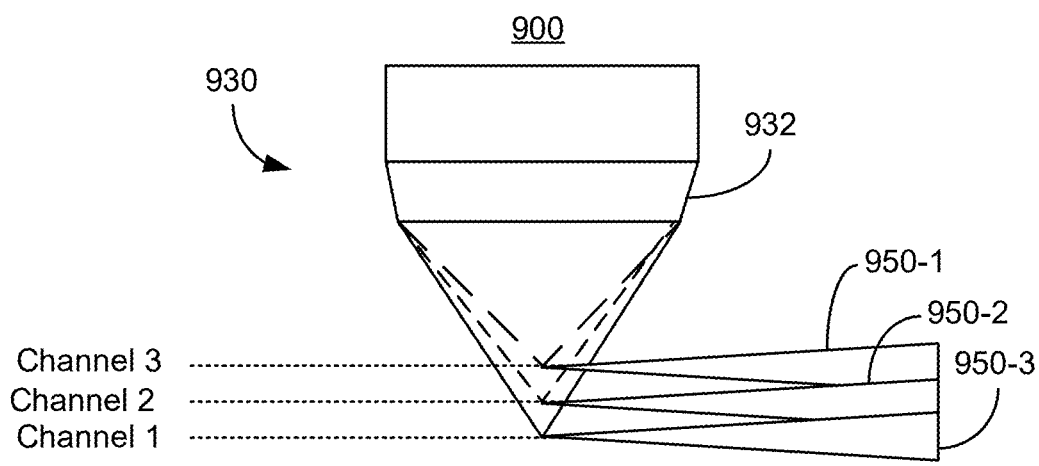

FIGS. 9A-9B depict an embodiment of chromatic offset correction for an optical microscope system 900. For simplicity, only a portion of optical microscope system 900 is shown and only along its detection path. FIG. 9A depicts detection unit 930 including detection path objective 932. Also shown is light sheet 950 having a waist in the focal plane of detection path objective 932. Light sheet 950 may include light of various wavelengths. For example, channels 1, 2, and 3 represent three different wavelengths for light sheet 950. Wavelengths corresponding to channel 2 are sharply focused by detection path objective. However, wavelengths corresponding to channels 1 and 3 are not sharply focused. Optical microscope system 900 is configured to provide dynamic focusing. In particular, the working distance for detection path objective 932 is varied based upon the wavelength. Thus, light sheet 950-1 having wavelength(s) corresponding to channel 1 is provided at one working distance from detection path objective 932. Similarly, light sheet 950-2 having wavelength(s) corresponding to channel 2 is provided at a second working distance from detection path objective 932. Light sheet 950-3 having wavelength(s) corresponding to channel 3 is provided at a third working distance from detection path objective 932. Thus, light of varying wavelengths has different working distances from detection path objective 932. Similarly, illumination path objective(s) 124 and 154 have different working distances for varying illumination light wavelengths. As a result, waists of the light sheet illuminations will have different locations along the illumination direction for different illumination light wavelengths. These working distances may be determined during a precalibration process. Thus, the corresponding precalibration parameters may be stored in memory. Using this information, optical microscope system 900 may automatically correct for chromatic variations (e.g. in 508 of method 500), such as chromatic offsets. Thus, performance of optical microscope 900 may be improved.

Figure 10A:
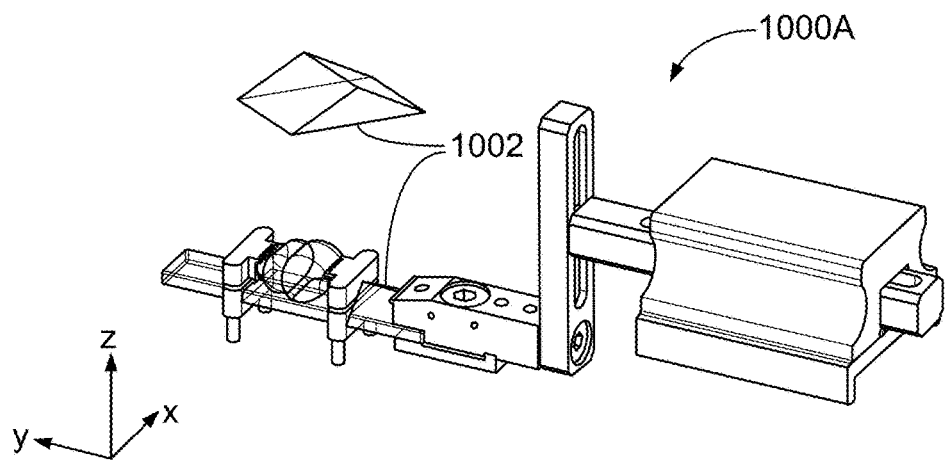
FIGS. 10A-10E depict embodiments of sample holder assemblies.
Figure 10B:
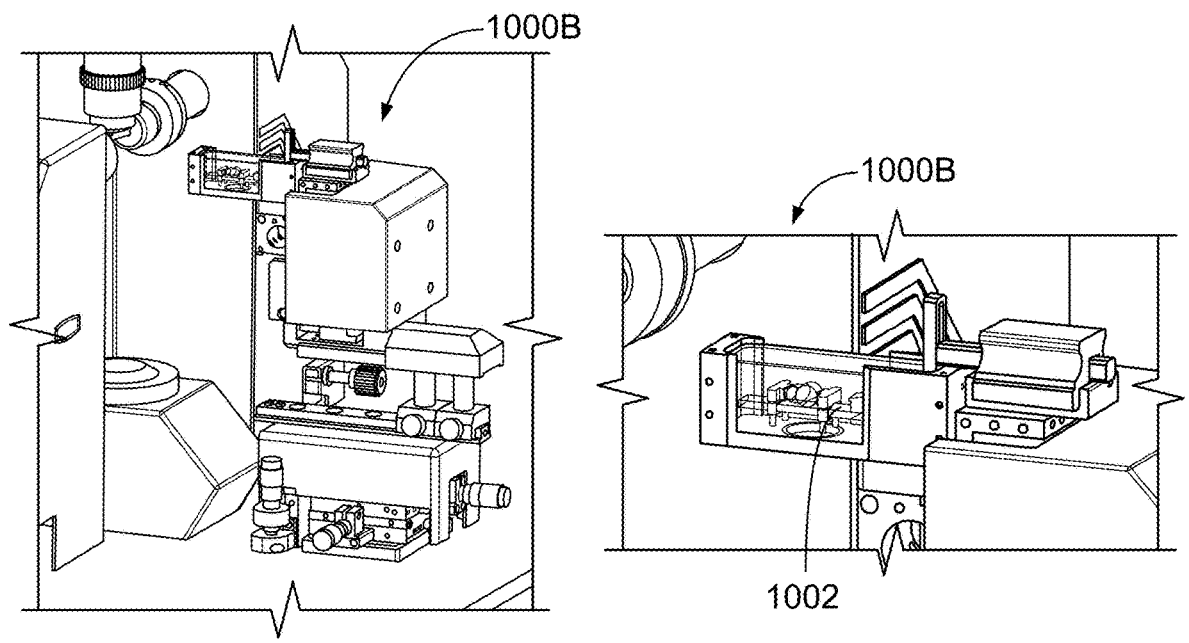
Figure 10C:
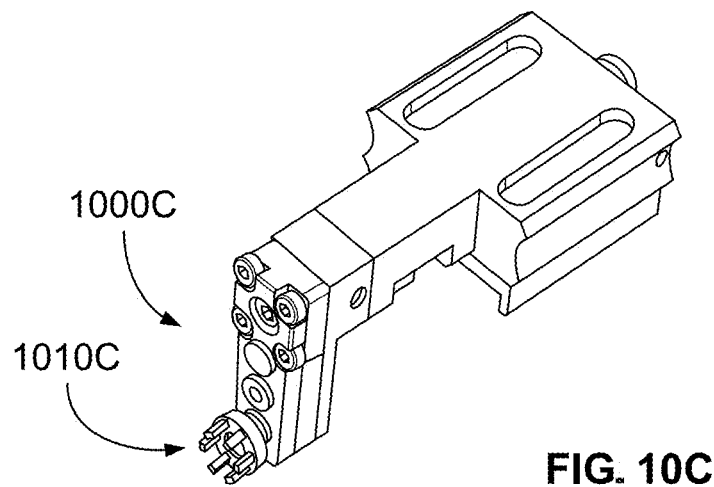
Figure 10D:
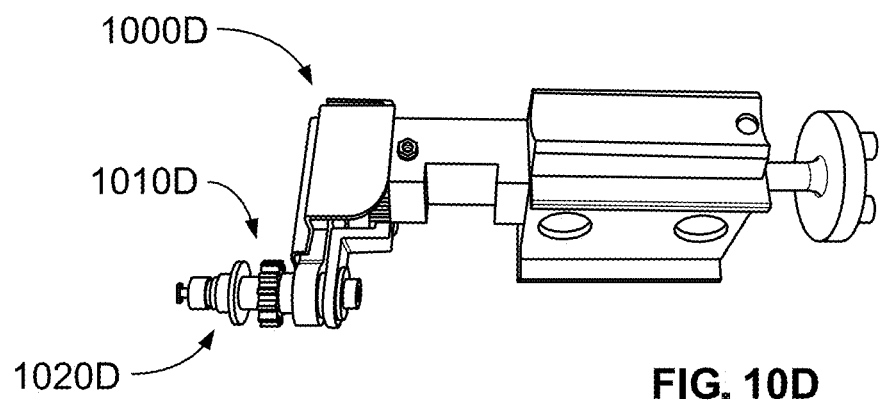
Figure 10E:
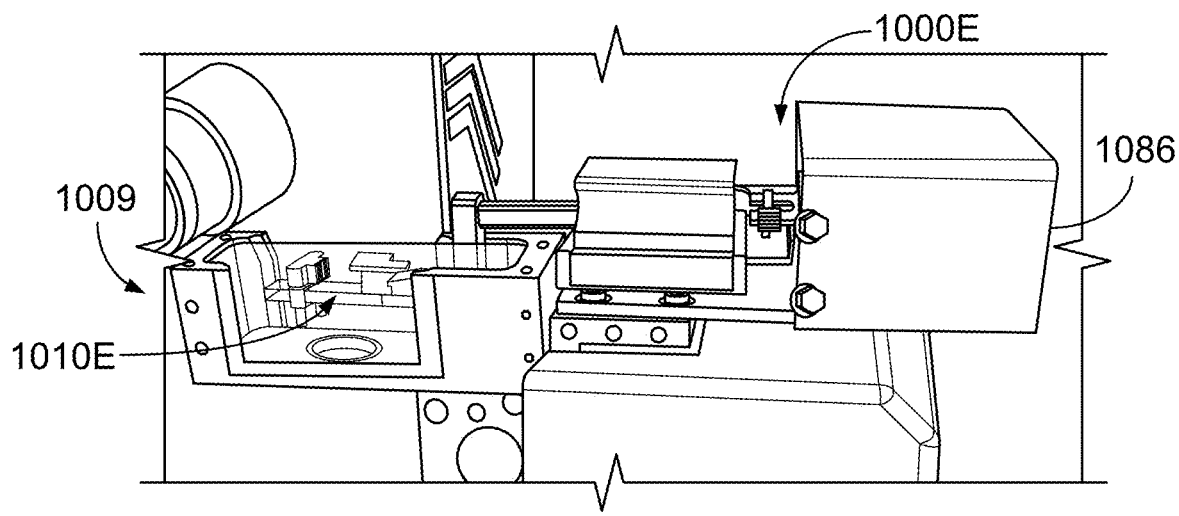

Improvements in optical microscopy, such as the ability to rapidly change between fields of view and capture high quality images rapidly, are facilitated by precalibration parameters. The values of such parameters may be determined during a precalibration process. FIGS. 10A-10E depict embodiments of portions of specimen holder and assemblies illustrating various aspects of an optical microscope system. FIGS. 10A-10B depict embodiments 1000A and 1000B of a specimen holder assembly incorporating calibration wedge 1002 and which may be used in calibration of an optical microscope system. FIGS. 10C-10E depict embodiments 1000C, 1000D, and 1000E of portions of specimen holder assemblies that may be used in changing the orientation of the microscopy specimen. Specimen holder assemblies 1000A, 1000B, 1000C, 1000D and 1010E may be used in optical microscope systems such as optical microscope system. Referring to FIGS. 10A-10B, wedge 1002 may be installed on a specimen holder assembly along with a specimen (as in FIG. 10A) or within the specimen chamber (as in FIG. 10B). The base of the wedge 1002 may be installed on horizontal or substantially horizontal plane of the specimen holder assembly. Wedge 1002 may be used to facilitate the calibration process.

Calibration wedge 1002 provides optical feedback to assist in alignment or calibration of an optical microscope system, such as optical microscope systems 1000, 100, and/or 800. Calibration wedge 1002 may be formed of fluorescent plastic and may be desired to function in a variety of media and with a variety of objectives. For example, wedge 1002 may be transparent and fluorescent. In some embodiments, wedge 1002 is desired to be fluorescent in all channels used by optical microscope system 1000 and provide a strong signal. Wedge 1002 is also desired to be resistant to photo bleaching. In some embodiments, the optical index of refraction of wedge 1002 is near 1.4 (e.g., at least 1.3 and not more than 1.5). Such an index of refraction is similar to the indices of refraction of most clearing media and keeps the index mismatch controlled. The wedge's surface angle is desired to be higher than the illumination numerical aperture so as not to crop the incoming light. For example, the angle shown is approximately nineteen degrees (e.g. at least eighteen degrees and not more than twenty degrees). However, other angles are possible. The top surfaces of wedge 1002 may be sanded to provide a texture that is readily visible. Consequently, the ridge (i.e. the vertex having the angle higher than the illumination numerical aperture) is also visible. The top surface or the ridge may be used to focus on during calibration. In some embodiments, the length of wedge 1002 is sufficient to cover most objectives' fields of view. For example, wedge 1002 may have a length of at least six millimeters.

FIGS. 10C-10E depict embodiments of portions of specimen holder assemblies 1000C, 1000D, and 1000E. Referring to FIG. 10C, the portion of specimen holder assembly 1000C shown may be an intermediate item to which a sample support (e.g. a glass holder plate for a medium-to-large specimen) can be attached. Cog 1010C may be used to couple to the sample support (and/or microscopy specimen) and rotate the microscopy specimen. This cog wheel rotation may be driven by sample rotation motor 1086 shown in FIG. 10E. Item 1010D of FIG. 10D may be used to couple to the sample support (and/or microscopy specimen) and rotate the microscopy specimen using belt rotation. The belt rotation may be driven using sample rotation motor 1086 of sample holder assembly 1000E. As indicated in FIG. 10E, sample rotation motor 1086 may be used to rotate the microscopy specimen via item 1010E (which is analogous to 1010C and 1010D). Also denoted in FIG. 10E is sample chamber 1009 in which the microscopy specimen resides. Sample chamber 1009 is analogous to sample chamber 109 of FIGS. 1A-1E.

Thus, sample rotation motor 1086 may be part of a specimen holder assembly. In the embodiments shown in FIGS. 10C-10E, the sample support can be attached to the tip of the last wheel in the rotation transfer mechanism. Although particular items 1010C, 1010D, and 1010E are shown as being used to transfer the rotation of the shaft of sample rotation motor 1086 to the sample support (e.g. glass plate for medium-to-large samples, Teflon-made plate for small-to-medium samples) other techniques may be used. Using sample rotation motor 1086, the orientation of the microscopy sample may be changed. Further, in some embodiments, sample rotation motor 1086 may be precalibrated and utilized to automatically change the orientation of the microscopy specimen, for example in method 500.

Figure 11:
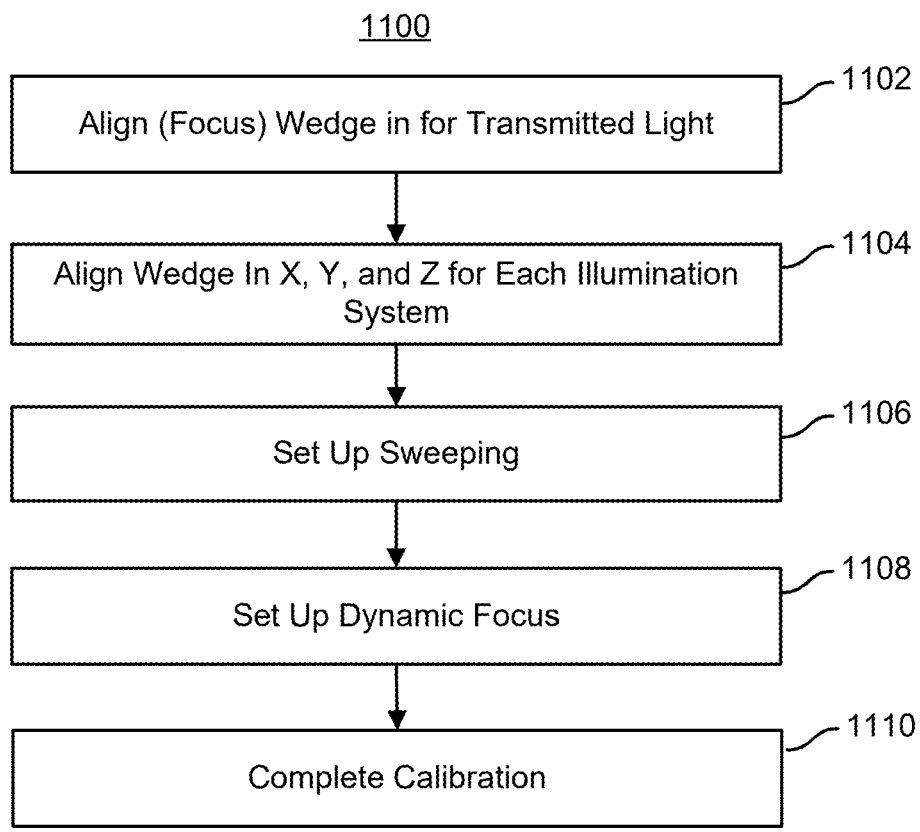
FIG. 11 depicts an embodiment of a method for calibrating an embodiment of an optical microscope system.

FIG. 11 depicts an embodiment of method 1100 for calibrating an embodiment of an optical microscope system, such as a SPIM, using a wedge such as wedge 1002. Method 1100 may include other and/or additional steps or substeps. Further, some steps and/or substeps may occur in another order, including in parallel. Method 1100 is discussed in the context of systems 100, 200, 800, 1000A, and 1000B. However, other systems may be used in some embodiments.

The wedge is aligned, or focused, for transmitted light, at 1102. This allows for alignment of the wedge (or corresponding specimen) with the detection plane (or focal plane)

of the detection system. In some embodiments, 1102 includes positioning wedge 1002 so as its ridge is positioned in the center of the field of view of the camera along or substantially along the y direction, shining transmitted light along the detection path, and focusing the both sides of the wedge about around the ridge by moving the sample z-stage such that the intersection of the detection plane with the both sides of the wedge around the ridge remains within the field of view. The intersection of the detection plane with the both sides of the wedge around the ridge can be made visible as two sharp in-focus textured stripes through which the detection plane passes. These two sharp in-focus stripes may not necessarily be strictly aligned with the y direction, as the wedge may be allowed to be positioned on not necessarily horizontal plane of the specimen holder assembly.

At 1104, the wedge is used to align each illumination unit along the x, y, and z directions. To do so, each direction (x, y, and z directions) is first separately aligned. For the y direction alignment, it is desired to position the light sheet to cover all the height (the y-direction dimension) of the field of view. To do so, each illumination unit is separately energized and the illumination unit is moved in the y direction by the y direction illumination stage motor 103 so that wedge 1002 is centered and uniformly illuminated by the light from each illumination unit. For the z direction alignment, the light sheet is desired to be aligned to the detection plane. To do so, each illumination unit is separately energized and the height of the illumination unit controlled by using the z direction illumination stage motor 104 to sharply focus the corresponding (i.e. nearest to each illumination unit) sharp in-focus stripe around the ridge. Thus, the light sheet is aligned with the detection plane. For the x direction alignment, the waist of the light sheet is desired to be centered in the field of view and the sharpness of the corresponding (i.e. nearest to each illumination unit) sharp in-focus stripe about the ridge optimized. To do so, each illumination unit is separately energized, the wedge is moved in the x direction such that the corresponding (i.e. nearest to each illumination unit) sharp in-focus stripe about the ridge is positioned in the middle of the field of view and the x-axis position of the illumination unit adjusted by the x direction illumination stage motor 102 to center the waist such that the stripe is sharp and in focus. The x, y and z direction alignments can be repeated in order to achieve perfect simultaneous alignment along x, y, and z directions. To do so, each illumination unit may be repeatedly moved along x, y, z directions until perfect alignment along x, y, and z directions is achieved.

Sweeping may also be calibrated to confirm settings for sweeping the light sheet, at 1106. At 1108, the dynamic focus is calibrated. This allows for chromatic offsets to be accounted for as discussed with respect to system 900. More specifically, this allows multi-channel acquisition and performs alignment between channels. Thus, medium chromatic dispersion may be accounted for. In particular, the offset for each channel and each illumination unit may be determined. Thus, as indicated in FIGS. 9A-9B, the heights for channels 1, 2, and 3 may be separately set. At 1110, calibration may be completed. For example, the parameters determined at 1102, 1104, 1106, and 1108 may be stored for later use and other alignment performed.

Thus, using method 1100, an optical microscope system may be aligned using a fluorescent wedge. Thus, parameters for the optical microscope system may be precalibrated. The precalibration values may be stored for use in optical microscope system 100, for example in methods 300, 400, and/or 500. Thus, in addition to preparing the optical microscope system for use, the calibration performed in 1100 may be used to aid in automatically, seamlessly, and rapidly switching between fields of view. Thus, performance of the optical microscope may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a request to change a field of view of an optical microscope system imaging a microscopy specimen including by receiving the request to change between a first magnification corresponding to a first field of view and a second magnification corresponding to a second field of view, either the second magnification being greater than the first magnification such that the second field of view occupies only a portion of the first field of view or the second magnification being smaller than the first magnification such that the second field of view includes the first field of view;
   in response to the request, automatically changing from a current field of view to a new field of view; and
   automatically adjusting parameters of the optical microscope system to align an illumination plane of a light sheet of the optical microscope system and a detection plane of the optical microscope system for the requested change based at least on a plurality of pre-calibrated parameters that correspond to the new field of view, an illumination path objective for the new field of view, and a detection path objective for the new field of view.

2. The method of claim 1, wherein the automatically adjusting further includes:
   at least one of adjusting a position of at least one translation stage or adjusting at least one of an angle of a deflection component in an illumination path or a focal length of a tunable lens in the illumination path.

3. The method of claim 2, wherein the translation stage is a motorized translation stage, the deflection component is a galvo mirror, and the tunable lens is an electrically tunable lens.

4. The method of claim 1, wherein the automatically adjusting further includes:
   adjusting a focal length of a tunable lens in a detection path.

5. The method of claim 1, further comprising:
   compensating for at least one of a first chromaticity of the illumination path objective, a second chromaticity of the detection path objective and a chromatic dispersion of the microscopy specimen.

6. The method of claim 1, wherein the automatically changing from the current field of view to a new field of view further includes:
   placing at least one of the illumination path objective in an illumination path or the detection path objective in a detection path.

7. The method of claim 6, wherein the illumination path objective is one of a plurality of illumination path objectives in a revolving illumination turret, the detection path objective is one of a plurality of detection path objectives in a revolving objective turret, and wherein the placing further includes:
   automatically rotating at least one of the revolving illumination turret or the revolving objective turret to select the at least one of the illumination path objective or the detection path objective.

8. The method of claim 1, further comprising:
determining the plurality of precalibrated parameters based on a fluorescent wedge coupled with a sample holder for the microscopy specimen.

9. The method of claim 1, further comprising:
automatically fine focusing the new field of view after the automatically adjusting the parameters is completed.

10. An optical microscope system for viewing a microscopy specimen, comprising:
a plurality of illumination optical elements in an illumination path and configured to transform light from an illumination source into a light sheet illuminating the microscopy specimen, the illumination optical elements including an illumination path objective;
a plurality of illumination mechanical elements for the illumination path and configured to modify at least one of the location of the light sheet illuminating the microscopy specimen, a microscopy specimen location, or a microscopy specimen orientation;
a plurality of detection optical elements in a detection path and including a detection path objective; and
a computer system coupled to the plurality of illumination optical elements, to the plurality of illumination mechanical elements, and to the plurality of detection optical elements, the computer system including a processor and a memory coupled with the processor and configured to provide the processor with instructions, the processor being configured to:
receive a request to change a field of view of an optical microscope system imaging the microscopy specimen;
in response to the request, cause at least one of the plurality of illumination elements or the plurality of detection optical elements to automatically change from a current field of view to a new field of view; and
automatically adjust parameters of the optical microscope system to align an illumination plane of a light sheet of the optical microscope system and a detection plane of the optical microscope system for the requested change based at least on a plurality of precalibrated parameters that correspond to the new field of view, an illumination path objective for the illumination path, and a detection path objective for the detection path.

11. The system of claim 10, wherein to receive the request the processor is further configured to:
receive the request to change between a first magnification corresponding to a first field of view and a second magnification corresponding to a second field of view, at least one of the second magnification being greater than the first magnification such that the second field of view occupies only a portion of the first field of view or the second magnification being smaller than the first magnification such that the second field of view includes the first field of view.

12. The system of claim 11, wherein the plurality of illumination optical elements includes at least one of a deflection component or a tunable lens and wherein the plurality of illumination mechanical elements includes at least one translation stage and wherein to automatically adjust, the processor is further configured to:
adjust at least one of a position of the at least one translation stage, an angle of the deflection component in the illumination path, or a focal length of the tunable lens in the illumination path.

13. The system of claim 12, wherein the translation stage is a motorized translation stage, the deflection component is a galvo mirror, and the tunable lens is an electrically tunable lens.

14. The system of claim 11, wherein the plurality of detection optical elements includes a tunable lens in the detection path and wherein to automatically adjust, the processor is further configured to:
adjust a focal length of the tunable lens.

15. The system of claim 11, wherein the processor is further configured to:
compensate for at least one of a first chromaticity of the illumination path objective, a second chromaticity of the detection path objective, and a chromatic dispersion of the microscopy specimen.

16. The system of claim 11, wherein a plurality of illumination path objectives resides in a revolving illumination turret and includes the illumination path objective, a plurality of detection path objectives resides in a revolving objective turret and includes the detection path objective, and wherein to automatically change from the current field of view to the new field of view, the processor is further configured to:
automatically rotate at least one of the revolving illumination turret or the revolving objective turret to select the at least one of the illumination path objective for the illumination path or the detection path objective for the detection path.

17. The system of claim 11, wherein the plurality of precalibrated parameters is based on a fluorescent wedge coupled with a sample holder for the microscopy specimen.

18. The system of claim 11, wherein the plurality of illumination optical elements includes a horizontal deflection component configured to horizontally move a direction with which light beam components of the light sheet are directed to the microscopy specimen; and
wherein the horizontal deflection component vibrates about a central rotational axis such that the beam components illuminate the microscopy specimen at horizontal light sheet directions that alternate many times due to a horizontal light sheet movement at least in part caused by the deflection component to reduce or eliminate a shadow caused by a substance of the microscopy specimen.

19. The system of claim 18, wherein the horizontal deflection component includes at least one of an oscillating mirror that oscillates about the central rotational axis or a galvo mirror.

20. The system of claim 18, wherein the plurality of illumination optical elements include:
an electronically tunable lens configured to vary a focal distance of the electronically tunable lens to dynamically vary a position of a waist of the light sheet illuminating the microscopy specimen; and
a second deflection component configured to vertically move the light sheet to illuminate the microscopy specimen at different horizontal planes, wherein the light sheet extends in the horizontal plane and the vertical movement of the light sheet corresponds to a movement in a direction perpendicular to the horizontal plane of the light sheet.

21. The system of claim 11, wherein the plurality of illumination mechanical elements include at least one rotation stage configured to rotate the microscopy specimen around at least one axis of rotation.

22. The system of claim 11, wherein the plurality of illumination optical elements include:
- at least one or a plurality of fluorescent optical filters configured to filter out direct laser light to enable a safe observation of the microscopy specimen by a human; and
- at least one set of oculars for observation of the microscopy specimen by a human.

23. A system for viewing a microscopy specimen, comprising:
- an illumination source configured to emit light that travels along an illumination path to illuminate the microscopy specimen placed on a detection path of an optical microscope system; and
- a plurality of illumination optical elements for the illumination path and configured to transform the light from the illumination source into a light sheet illuminating the microscopy specimen, the illumination optical elements including a plurality of illumination path objectives residing in a revolving illumination turret;
- a plurality of illumination mechanical elements for the illumination path and configured to modify at least one of the location of the light sheet illuminating the microscopy specimen or a microscopy specimen location;
- a plurality of detection optical elements for the detection path and including a plurality of detection path objectives residing in a revolving objective turret; and
- a computer system coupled to the plurality of illumination optical elements, to the plurality of illumination mechanical elements, and to the plurality of detection optical elements, the computer system including a processor and a memory coupled with the processor and configured to provide the processor with instructions, the processor being configured to:
  - receive a request to change a field of view of the optical microscope system imaging the microscopy specimen;
  - in response to the request, at least one of automatically rotate the revolving illumination turret to place an illumination path objective of the plurality of illumination path objectives in the illumination path or automatically rotate the revolving objective turret to place a detection path objective of the plurality of detection path objectives in the detection path, thereby changing the field of view from a current field of view to a new field of view; and
  - automatically adjust parameters of the optical microscope system to align an illumination plane of a light sheet of the optical microscope system and a detection plane of the optical microscope system for the requested change based at least on a plurality of precalibrated parameters that correspond to the new field of view, a selected illumination path objective, and a selected detection path objective.

24. The system of claim 23, wherein the plurality of illumination optical elements includes at least one of a galvo mirror or an electrically tunable lens, wherein the plurality of illumination mechanical elements includes at least one translation stage, and wherein to automatically adjust the parameters, the processor is further configured to:
- adjust at least one of an angle of the galvo mirror in the illumination path, a position of at least one translation stage, or a focal length of the electrically tunable lens in the illumination path.

25. The system of claim 23, wherein the plurality of illumination optical elements includes a galvo mirror configured to horizontally move a direction with which light beam components of the light sheet are directed to the microscopy specimen; and
- wherein the galvo mirror includes an oscillating mirror that vibrates about a central rotational axis such that the beam components illuminate the microscopy specimen at horizontal light sheet directions that alternate many times due to a horizontal light sheet movement at least in part caused by the galvo mirror to reduce or eliminate a shadow caused by a substance of the microscopy specimen.

* * * * *